US006687698B1

(12) United States Patent
Nixon et al.

(10) Patent No.: US 6,687,698 B1
(45) Date of Patent: Feb. 3, 2004

(54) ACCESSING AND UPDATING A CONFIGURATION DATABASE FROM DISTRIBUTED PHYSICAL LOCATIONS WITHIN A PROCESS CONTROL SYSTEM

(75) Inventors: Mark Nixon, Round Rock, TX (US); Teresa Chatkoff, Austin, TX (US); Stephen Gilbert, Austin, TX (US)

(73) Assignee: Fisher Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/560,199

(22) Filed: Apr. 28, 2000

Related U.S. Application Data

(60) Provisional application No. 60/160,104, filed on Oct. 18, 1999.

(51) Int. Cl.[7] .............................................. G06F 17/30
(52) U.S. Cl. .......................... 707/10; 707/2; 707/202; 711/141; 711/163; 709/201
(58) Field of Search ............... 707/2, 10, 201, 707/202; 709/224, 201; 340/825; 711/163, 141

(56) References Cited

U.S. PATENT DOCUMENTS

| | | | | |
|---|---|---|---|---|
| 4,007,450 A | | 2/1977 | Haibt et al. ............... 340/172.5 |
| 4,888,726 A | | 12/1989 | Struger et al. .............. 364/900 |
| 5,412,806 A | * | 5/1995 | Du et al. ........................ 707/2 |
| 5,560,005 A | * | 9/1996 | Hoover et al. ................ 707/10 |
| 5,581,261 A | * | 12/1996 | Hickman et al. ....... 340/825.49 |
| 5,596,744 A | * | 1/1997 | Dao et al. ...................... 707/10 |
| 5,724,575 A | * | 3/1998 | Hoover et al. ................ 707/10 |
| 5,761,429 A | * | 6/1998 | Thompson .................. 709/224 |
| 5,828,851 A | | 10/1998 | Nixon et al. ................. 395/285 |
| 5,835,601 A | | 11/1998 | Shimbo et al. ............... 380/49 |
| 5,838,563 A | | 11/1998 | Dove et al. .................. 364/188 |
| 6,026,413 A | | 2/2000 | Challenger et al. ......... 707/202 |
| 6,088,717 A | | 7/2000 | Reed et al. .................. 709/201 |
| 6,115,713 A | | 9/2000 | Pascucci et al. .............. 707/10 |
| 6,216,212 B1 | | 4/2001 | Challenger et al. ......... 711/163 |
| 6,256,712 B1 | | 7/2001 | Challenger et al. ......... 711/141 |
| 6,263,487 B1 | | 7/2001 | Stripf et al. .................... 717/1 |
| 6,343,290 B1 | * | 1/2002 | Cossins et al. ............... 707/10 |
| 6,345,288 B1 | | 2/2002 | Reed et al. .................. 709/201 |

FOREIGN PATENT DOCUMENTS

WO    WO 97/26587    7/1997

OTHER PUBLICATIONS

Search Report issued by the UK Patent Office for Application GB 0025371.6 dated Oct. 16, 2001.
J.D. Schoeffler "Realtime Operating Systems For Distributed Process Control Systems" pp. 1–14 (Aug. 1975).
Amended Search Report issued by the UK Patent Office for Application GB 0025371.6 dated Oct. 12, 2001.

* cited by examiner

Primary Examiner—Jean M. Corrielus
(74) Attorney, Agent, or Firm—Marshall, Gerstein & Borun LLP

(57) ABSTRACT

A configuration database includes multiple databases distributed at a plurality of physical locations within a process control system. Each of the databases may be accessed by users at any of the sites within the process control system. A database server having a shared cache accesses a database in a manner that enables multiple subscribers to read configuration data from the database with only a minimal number of reads to the database. To prevent the configuration data being viewed by subscribers within the process control system from becoming stale, the database server automatically detects changes to an item within the configuration database and sends notifications of changes made to the item the each of the subscribers of that item so that a user always views the state of the configuration as it actually exists within the configuration database.

33 Claims, 14 Drawing Sheets

ACCESSING AND UPDATING A CONFIGURATION DATABASE FROM DISTRIBUTED PHYSICAL LOCATIONS WITHIN A PROCESS CONTROL SYSTEM

RELATED APPLICATIONS

This is a regular filed application based on Provisional Application Serial No. 60/160,104 filed Oct. 18, 1999 entitled "Accessing and Updating a Configuration Database From Distributed Physical Locations Within a Process Control System."

FIELD OF THE INVENTION

The present invention relates generally to process control systems and, more particularly, to a process control configuration system having a configuration database that can be accessed and updated from geographically distributed physical locations within a process control system.

DESCRIPTION OF THE RELATED ART

Process control systems, like those used in chemical, petroleum or other processes, typically include at least one process controller communicatively coupled to at least one host device or operator workstation and to one or more field devices via analog and/or digital buses or other communication lines or channels. The field devices, which may be, for example, valves, valve positioners, switches, transmitters (e.g., temperature, pressure and flow rate sensors), etc. perform functions within the process such as opening or closing valves and measuring process parameters. During runtime of a process, the process controller receives signals indicative of process measurements made by the field devices and/or other information pertaining to the field devices via an input/output (I/O) device, uses this information to implement a control routine and then generates control signals which are sent over the buses or other communication channels via the input/output device to the field devices to control the operation of the process. Information from the field devices and the controller is typically made available during runtime to one or more applications executed by the operator workstation to enable an operator to perform any desired function with respect to the process, such as viewing the current state of the process. Additionally, configuration applications executed on a user interface, such as a host device, workstation, laptop computer, etc. may be used to modify the operation of the process, configure the process, view the configuration of the process, document the process configuration, etc.

Generally speaking, process control systems are configured using a configuration database that stores configuration information pertaining to each of the hardware and software elements within the process control system, the manner in which the hardware elements, such as different devices and controllers in the process, are physically interconnected and the manner in which different software elements, such as control modules, communication modules, etc., are associated with and executed by the different devices within the process control system to perform process control. In some cases, the configuration database is an object-oriented database that stores configuration objects or components for each different logical element of a process control system as objects. The configuration database may, for example, include a library that stores object templates for some or all of the hardware and software elements, these templates being used to create configuration objects for instances of hardware or software elements actually used within the process control system. The configuration database may also include setup or physical network sections that define the manner in which the physical elements of a process control system are set up, distributed and connected together. In some cases, the configuration database also includes a control section that defines how control is performed using controllers, field devices and control modules or control routines executed in the controllers and/or the field devices. During configuration of the process control system, a configuration routine or application executed in, for example, a user interface or workstation, is used to create or modify the configuration database to reflect the actual configuration of the process control system. This configuration application typically uses the information within the configuration database to configure devices, controllers, etc. associated with the process control system and stores new configuration information in the configuration database after any configuration activity is performed, such as when a device or software element is added to the system, changed, etc.

Still further, the configuration database is generally used to display the current configuration of the process control system to users via user interfaces connected to the process control system. In the past, some of the process control system user interfaces, configuration databases and controllers were communicatively connected together by a dedicated bus, such as an Ethernet bus, to form a local area network (LAN). Because the dedicated Ethernet bus has a large bandwidth, and because any particular signal or data request sent over the Ethernet bus does not have to travel over a very long distance within the LAN, communication with the configuration database by one of the user interfaces is fairly straightforward and fast in these systems. As a result, configuration display routines executed in the user interfaces typically access and retrieve configuration information from the configuration database each time the user indicates or requests information pertaining to the configuration of the process control system. This retrieved information is then sent out over the Ethernet bus and is displayed to the user at the user interface. Because of speed (or high bandwidth) of the dedicated Ethernet bus, multiple users can access the configuration database relatively simultaneously and can view the same or different configuration data pertaining to the configuration of the process control system. Similarly, different users can reconfigure different parts of the process control system because any new configuration data that was generated was able to be provided directly to the configuration database in a relatively short amount of time via the dedicated Ethernet bus. Still further, because only those devices connected to the LAN can access the configuration database, and because the LAN is typically limited to a single process location, there is not much need to enable a large number of user interfaces to access the configuration database simultaneously.

Recently, however, there has been a general increase in the size of some process control systems and there has been a desire to integrate configuration information for process control networks spread out or distributed over larger or separated geographical areas. For example, some users wish combine the configuration data associated with different process sites, which may be in different counties, states or even different countries, thereby allowing an operator at a first site to access and view configuration information about a second site and possibly even perform configuration activities that effect the second site from the first site. In another example, a user may wish to integrate an oil well located on a platform many miles out in the ocean with an oil refinery process control system having numerous controllers, user interfaces, etc. located on the mainland. In this case, it is desirable to enable a user at the oil refinery site to reconfigure or effect the configuration of the devices on the oil well platform without actually having to fly out to the platform, connect a user interface to a terminal on the oil well platform and reconfigure the oil well controller, as is typically necessary now. Still further, with the integration of multiple process control sites, the number of user interfaces which may be used to simultaneously access the configuration databases of these sites increases significantly.

When integrating multiple geographically separated sites, however, it is practically, if not actually, impossible to connect the different sites using a common dedicated bus, such as the Ethernet bus, due to the distances involved. It is possible, however, to use a satellite, cellular or other type of wireless link or a wide, area network link, such as the Internet, or T1 lines, to establish a communication connection between the different sites of a process control system, to thereby enable the integration of geographically separated portions of a process control network. However, satellite, cellular and other wide area wireless communication links are typically very expensive to use and, if used, are generally shared so that they can only provide a limited amount of bandwidth when compared to a dedicated bus, such as an Ethernet bus. Likewise, the Internet, T1 lines and other shared wide area networks provide only a limited amount of bandwidth or throughput and are, therefore, typically very slow for data transfer when compared to a dedicated Ethernet local area network bus. Still further, the geographical distance between the different sites and the need to provide secure and assured communications between the sites using, for example, acknowledgments of data packets, as provided in the IP, TCP and UDP communication protocols, further add to the delay of communications between the sites.

As a result of the delay in communications between geographically diverse sites of a process control system and the increase in the number of user interfaces or other devices accessing a configuration database, it is difficult to provide a configuration database that stores the data for the entire process control system, including the devices in each of the geographically diverse sites in a manner that can be accessed in a fashion by users at all of the different sites and in a manner that can altered by users at the different sites using current configuration database accessing procedures. Specifically, if the configuration database is located at a main site, users at a remote site will have to download all of the configuration data on a refresh basis over the slow or remote link, which may take an inordinate amount of time. Still further, the sheer increase in the number of users accessing the configuration database may increase the access time to any piece of information within the configuration database to an unacceptable level. Likewise, when reconfiguring the process control system, the delay in communications between a main site and a remote site may enable two different users to try to reconfigure the same component of the process control system leading to confusion and error. Thus, for example, a user at a remote site may request and obtain the current configuration of the process from the configuration database at the main site, may reconfigure a portion of the process control system at the remote site and then send the new configuration data to the configuration database at the main site. In the meantime, however, a user at the main:site may reconfigure the same portion of the process control system and, because there is relatively no delay in communications at the main site, may store this new configuration in the configuration database before the user at the remote site attempts to send new configuration data generated at the remote site to the configuration database for storage, which leads to errors.

In some cases, it may not be possible or practical to even provide a slow or low bandwidth communication link between different sites, in which case configuration of a remote site has to occur at the remote site and then has to be uploaded to the configuration database at the main site. However, this off-line configuration can cause problems if different users try to reconfigure the remote site at or near the same time, or if a user tries to reconfigure a remote site before another user who has already reconfigured the remote site updates the configuration database to reflect the changes already made to the remote site.

SUMMARY OF THE INVENTION

A configuration database distribution, access and alteration strategy is provided to enable numerous geographically separated locations of a process control system to be integrated together using a common configuration database in a manner that enables users at each of the different locations to view and change the configuration database in a timely, secure and non-conflicting manner, even when the different locations of the process control system are communicatively connected via a low bandwidth or slow (i.e., delayed) communication link or are only intermittently communicatively connected via, for example, a modem connection.

According to one aspect of the invention, a distributed configuration database is provided having components thereof spread over or throughout the different geographical portions of a process control system in such a manner that shared configuration data, i.e., configuration data pertaining to or applicable to more than one location, is stored in a database assessable by each of the other locations via one or more slow or low bandwidth communication links and data that pertains only to a particular location is stored in a configuration database at that location. In this manner, the configuration information that is most likely to be accessed at a particular location (i.e., the configuration information pertaining to that location) is accessible over a local area network while configuration information pertaining to other locations is accessible over a slow or low bandwidth communication link. As a result, only shared communication data and data that is related to a different location needs to be sent over a slow or low bandwidth communication link.

To prevent configuration data being viewed by users within the process control system from becoming stale, the configuration database access system at each location may automatically send changes made to the configuration database to each of the users currently viewing that data so that the user views the state of the configuration as it actually exists in the configuration database. In one embodiment, each portion of the configuration database includes a data access routine that uses a shared cache to coordinate the delivery of configuration components to each of the users or subscribers currently viewing that data in a way that reduces the number of reads to the configuration database, which increases the speed of accessing data from the configuration database. This shared cache may incorporate a locking mechanism to enable locking and reservation of components within the configuration database. If desired, the configuration information obtained by each user may be stored locally to enable the user to view the configuration information even if the communication link to the configuration database storing the master copy of that information goes down or otherwise becomes unavailable.

DESCRIPTION OF THE PREFERRED EMBODIMENTS

Figure 1:
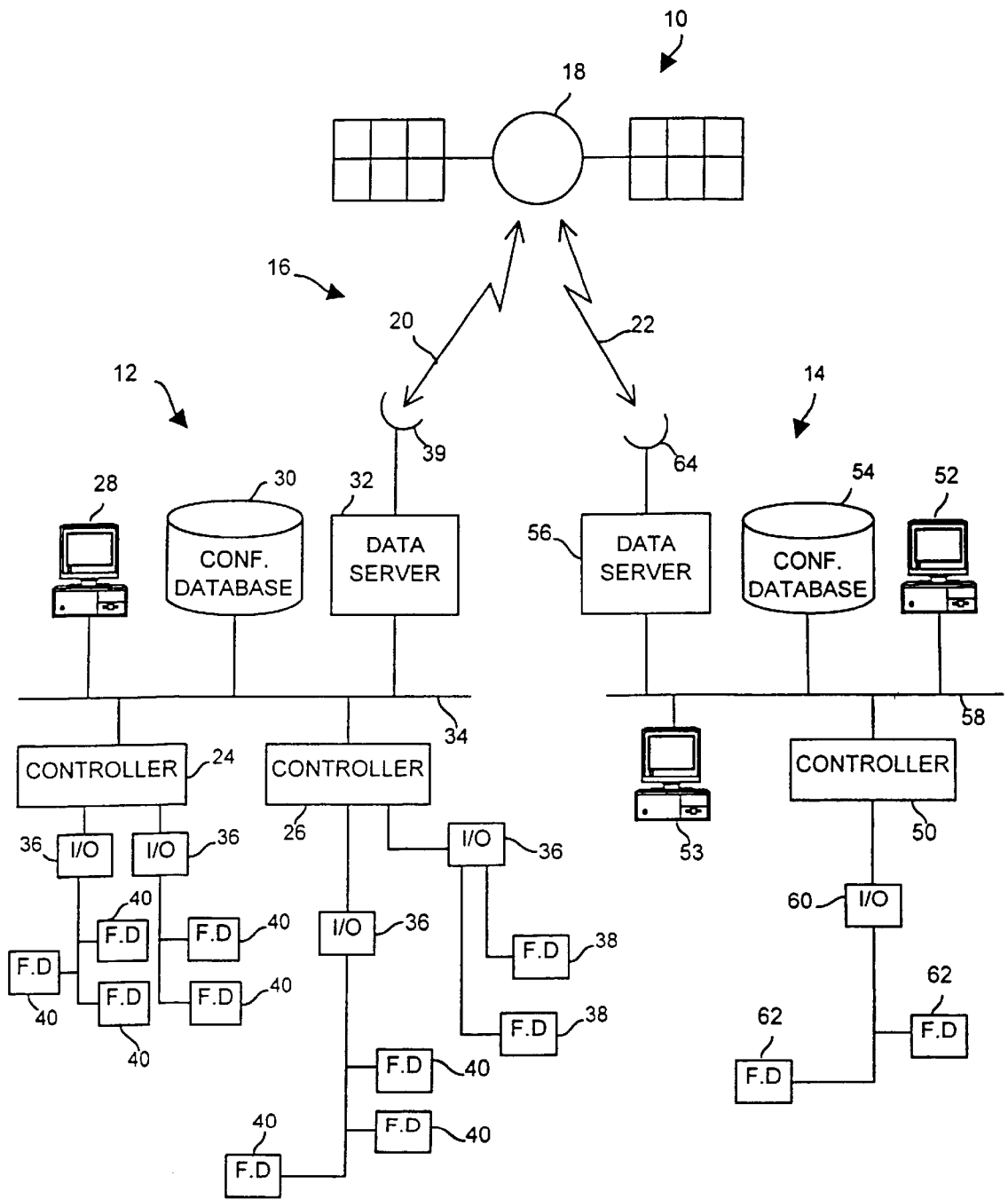
FIG. 1 is a block diagram of a process control system having two geographically separated sites communicatively connected via a satellite communication link.

Referring now to FIG. 1, a process control system 10 includes geographically separated sites or locations 12 and 14 communicatively connected via a satellite communication link 16 formed by a satellite 18 having a first uplink/downlink channel 20 and a second uplink/downlink channel 22 which may be two way channels. The first site 12, which will be referred to herein as the local or main site 12, includes two process controllers 24 and 26 connected to a user interface 28, a configuration database 30 and a data server 32 via a dedicated local area network bus 34 which may be, for example an Ethernet or any other desired bus or communication line. The user interface 28 may be any desired type of host workstation or computer, such as any type of personal computer, laptop computer, etc. while the configuration database 30 may be a stand alone database device or may be integrated into any other device, such as the user interface 28 or the data server 32. The data server 32 includes an antenna 39 which the data server 32 uses to communicate over the slow or low bandwidth communication link 16 to the second process control site 14, which will be referred to herein as the remote site 14.

Each of the controllers 24 and 26 is connected to one or more input/output (I/O) devices 36 which, in turn are connected to field devices which may be any desired type of field devices, such as conventional 4–20 milliamp devices 38 or any smart field devices 40 like HART®, PROFIBUS®, Actuator Sensor Interface (AS-Interface), WORLDFIP®, Device-Net®, CAN, FOUNDATION™ Fieldbus (hereinafter "Fieldbus") etc., devices. Of course, the devices 38 and 40 may be any desired types of devices such as sensors, transmitters, valves, fans, mixers, positioners, etc. which may perform any control, measurement or other function within the process control system 10. The controllers 24 and 26 may communicate with the field devices 38 and 40 using any known or desired type of I/O devices 36 and communication protocols such as the protocols associated with any of the above-identified types of devices. Generally speaking, the controllers 24 and 26, which may be, by way of example only, DeltaV™ controllers sold by Fisher-Rosemount Systems, Inc., each include a processor and a memory for storing data, programs, and control routines (such as process control modules) used to implement control of the process 10 at the main site 12. Generally speaking, the controllers 24 and 26 receive signals from the field devices 38 and 40, execute process control routines and provide control signals to the devices 38 and 40 to thereby implement control of the process 10.

Similarly, the remote site 14 includes a process controller 50 connected to user interfaces 52 and 53, a configuration database 54 and a data server 56 via a dedicated local area network bus 58 which may be, for example an Ethernet or any other desired bus or communication line. The controller 50 is illustrated as being connected through an I/O device 60 to two smart field devices 62 but could be connected to any other numbers or types of field devices. The data server 56 uses an antenna 64 to communicate via the slow or low bandwidth link 16 to the data server 32 to thereby effect communications between the local site 12 and the remote site 14. The devices within the remote site 14 may be the same as or similar to the corresponding devices within the local site 12 and perform process control and reporting operations at the remote site 14. Likewise, it will be understood that other devices or other numbers of devices could be connected within either or both of the sites 12 and 14 to perform process control and configuration activities in any desired manner. In fact, one of the sites, such as the remote site 14, could be a single device, like a user interface, if so desired. The data server 32 could be connected directly to the configuration database 30 and, similarly, the data server 56 could be connected directly to the configuration database 54 instead of being connected through an Ethernet bus.

As will be understood, the data servers 32 and 56 operate to provide a communication connection between the two buses 34 and 58 to thereby enable communication between the devices within the local site 12 and the remote site 14. While the communication link 16 is illustrated as a satellite link, any other communication link could be used instead, including for example, a cellular link, a modem or telephone line link, an Internet link or any other wireless or wide area or shared local area network link. Of course, any desired communication strategy may be employed within the communication link 16 to provide communication of data via the link 16. Thus, any communication protocol, such as the IP or TCP or UDP protocols may be used and any modulation techniques, error encoding techniques, etc. may be used to implement communication via the link 16 including, for example, spread spectrum techniques. Preferably, some sort of data acknowledgment scheme is used in the communication link 16 to assure secure and reliable communications in the presence of noise or other interference. If desired, the data acknowledgment scheme or technique described in U.S. patent application Ser. No. 09/418,747, entitled "Deferred Acknowledgment Communications and Alarm Management" which was filed on Oct. 15, 1999, which is assigned to the assignee of the present invention and which is hereby expressly incorporated by reference herein, may be used to effect communications through the communication link 16. Generally speaking, the use of the communication link 16 enables geographically separated process control sites or systems to be integrated together to form a single process control network wherein the devices within one site can communicate with the devices at the other site to perform control and configuration activities.

Unfortunately, communications over the communication link 16 will typically be much slower than communications over the LAN buses 34 and 58 due to the distances between the sites 12 and 14. Furthermore, the communication link 16 may have a low bandwidth as compared to the dedicated LAN buses 34 and 58 and will generally be more susceptible to noise and other errors than communications over the LAN buses 34 and 58. These factors generally tend to make the communication link 16 a source of communication bottlenecks within the process control system 10.

According to the present invention, configuration data pertaining to the manner in which the process control system 10 is configured is stored in one or both of the configuration databases 30 and 54. Still further, one or more of the user interfaces 28, 52 and 53 or other devices may store and, at an operator's request, execute a configuration application. This configuration application may access one or more of the configuration databases 30 and 54 to obtain configuration information, such as information pertaining to the configuration of the devices, software modules, etc. within the process control network 10, and may display the obtained configuration information on a screen for viewing for a user. The configuration application may also enable a user to add new devices, software elements or other elements to the system, provide new communications between devices within the system, change already existing elements within the system, etc. to thereby reconfigure the process control system 10. In another instance, a configuration application executed in a first database server, such as the server 32, may access information from another database server, such as the server 54, via the slow link 16 to provide this information to a still different remote location (not shown in FIG. 1). Of course, any desired process control configuration application or routine may be used, such as the configuration applications provided with the DeltaV products sold by Fisher Rosemount Systems, Inc. In particular, the DeltaV configuration applications display process control configuration information in a Windows-type explorer tree format and enables a user or operator to reconfigure the system by dragging and dropping elements within the configuration tree onto one another to thereby load those elements in different devices or to indicate the placement of process control elements in different areas of a process, to indicate the connection of devices to different controllers, buses or I/O devices, etc., or to load software elements within different devices. U.S. Pat. No. 5,838,563 to Dove et al.("System for Configuring a Process Control Environment"), U.S. Pat. No. 5,828,851 to Nixon et al. ("Process Control System Using Standard Protocol Control of Standard Devices and Nonstandard Devices"), U.S. patent application Ser. No. 08/631,519 to Nixon et al. ("Process Control System Including a Method and Apparatus for Automatically Sensing the Connection of Devices To a Network") filed Apr. 12, 1996, and U.S. patent application Ser. No. 08/631,458 to Dove ("System for Assisting Configuring a Process Control Environment") filed Apr. 12, 1996, all of which are assigned to the assignee of the present invention, and all of which are expressly incorporated by reference herein, describe process control configuration applications which enable a user to graphically create process control routines and elements, to auto-sense devices within a process control system and to provide control of devices within a process control system. Of course, any other type of configuration applications could be executed in the user interface or in a server database or other device to access the configuration databases 30 and 54, including any other type of graphical configuration applications and non-graphical configuration applications.

Figure 2:
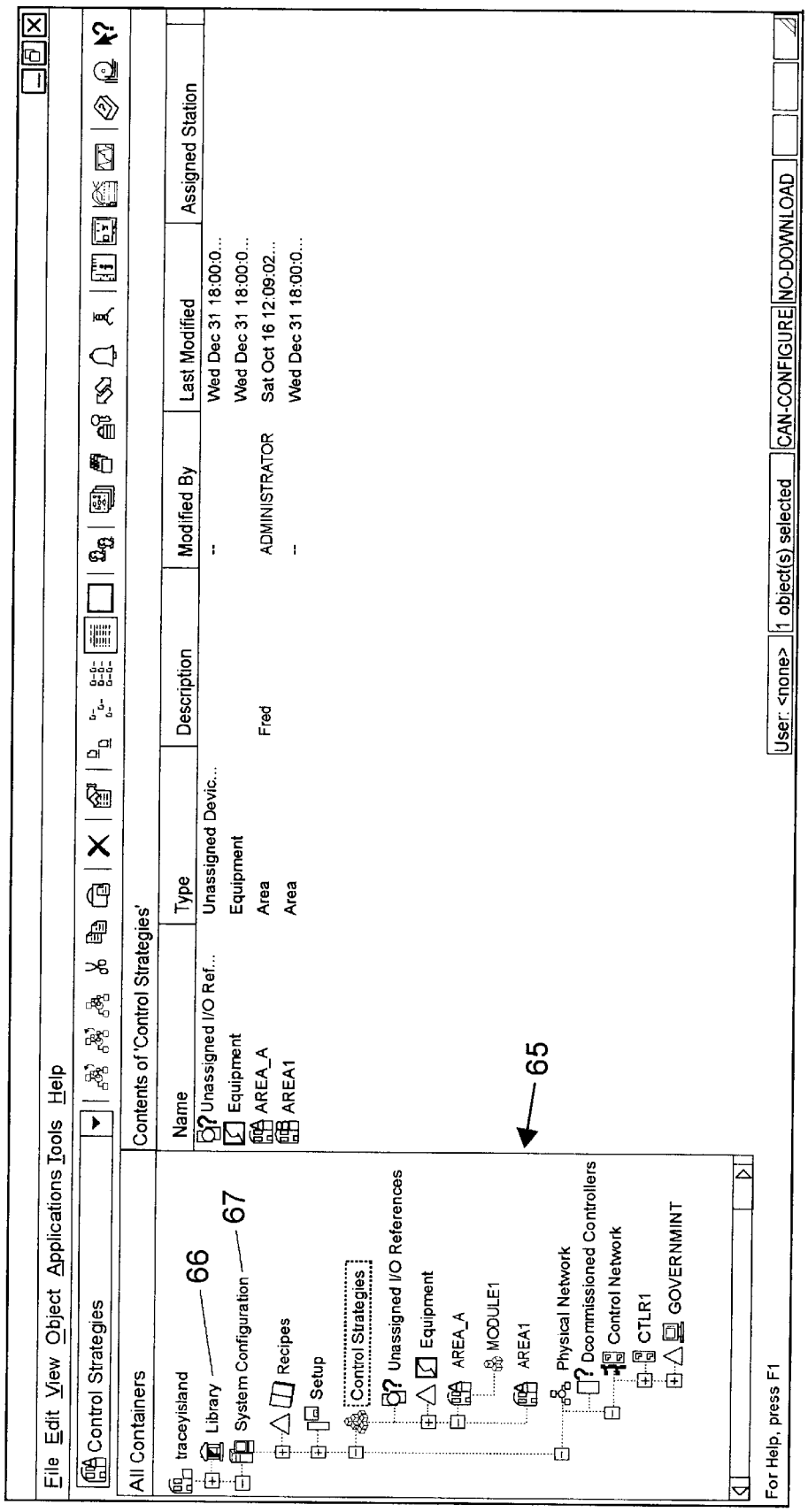
FIG. 2 is a diagram of an exemplary process control system hierarchy displayed by a configuration application.

For the sake of illustration, FIG. 2 shows an example process control configuration tree 65 that may be used to display a configuration of a process control system and that may be used to specify changes to the configuration of a process control system graphically. Generally speaking, the configuration tree 65 of FIG. 2 depicts and provides information pertaining to the configuration of a plant named Tracey Island. The configuration system of Tracey Island (named "traceyisland" in the tree 65) includes a library section 66 which may include, for example, templates for different device configurations, device definitions, software elements, such as control modules, etc., or other objects used at the Tracey Island plant. Although these templates are not shown in the tree 65, they could be shown by selecting (e.g., double clicking) the Library icon 66. The configuration tree 65 may also have a system configuration section 67 illustrating the manner in which the devices, such as controllers, I/O devices, field devices, user interfaces, etc. are physically located within the process. The illustrated system configuration for the Tracey Island plant has recipes (which define processes to be performed in the plant to, for example, make different products), setup information and control strategies. As illustrated, the control strategies icon or component has a number of children components including unassigned I/O references, equipment, and two areas (which are physical areas) named Area__A and Area1. The Area__A includes a Module1 child component illustrating that the Module 1 control module is loaded within the Area__A part of the Tracey Island plant. The system configuration also includes a physical network having a list of decommissioned controllers, and a control network icon. The control network icon or component has one or more commissioned controllers (only controller CTLR1 is illustrated) and a user interface (named Governmint) associated with the operation of the controller CTRL1. Each controller may have one or more I/O devices attached thereto and each I/O device may have one or more field devices attached thereto to be communicatively coupled to the controllers within the tree 65. However, these components are not shown in FIG. 2, but could be if, for example, the CTRL1 icon was selected by a user.

It will be noted that the configuration components illustrated in FIG. 2 have parent child relationships, wherein, for example, the system configuration 67 has direct children of recipes, setup, control strategies and physical network. Likewise, the control strategies is a parent of unassigned I/O references, equipment, Area_A, and Area1. Area_A is a parent of the Module 1 component. Of course, each of the children components may have further children and so on, so that the user may view any level of the configuration tree 65 to see what objects are stored in which devices, which devices are located in which physical zones, and how different devices are communicatively connected together. Generally, the hierarchy of FIG. 2 indicates the presence of non-displayed children components by placing a plus (+) symbol next to the parent component. Also, information about a selected component, including the children thereof, may be displayed on the right side of the screen as illustrated for the control strategies component of FIG. 2. Of course, further information about these components may be obtained by selecting these components within the hierarchy of FIG. 2.

While FIG. 2 illustrates an example configuration hierarchy, it will be understood that the configuration hierarchy for a process control network can illustrate other devices and modules and take on other dependencies. Also, a process may be divided into a number of physical sites, and/or zones and each of these sites or zones may have controllers, user interfaces, etc. associated therewith, which may be shown in the hierarchy. Of course, a user may initially view a part of the tree 65 of FIG. 2 and then select an element within the tree 65, such as the Area_A, to drill down further into the configuration tree 65. This selection causes the configuration application providing the hierarchy tree 65 to access the children of the selected object and to display these children on the display screen. In some cases, the configuration information may be stored as objects in an object oriented database and the objects within the database may have the same relationships as those illustrated in the configuration tree displayed by the configuration application.

It will be understood that the configuration objects or components illustrated in the hierarchy tree 65 of FIG. 2 may be stored in and accessed from the configuration databases 30 and 54 of FIG. 1. The information stored in the configuration databases 30 and 54 which may be, for example, object oriented databases of any desired type, may be stored in any desired manner and may have relationships related to, or the same as the relationships illustrated in FIG. 2.

Prior art process control networks typically do not have separate sites, such as sites connected via a slow or remote communication link. As such, each process control system typically includes its own configuration database having configuration data pertaining only to the configuration of the devices within that system. Furthermore, this configuration database is typically accessible by all of the user interfaces or other devices connected to the LAN of the process control system and can be accessed very quickly due to the high bandwidth of the LAN bus and the relatively small distance between the user interface and the configuration database within the LAN. Thus, for example, in prior art systems, each of the sites 12 and 14 would include its own configuration database storing information pertaining only to the devices within one of the sites, i.e., the site 12 or the site 14, but not both. In these cases, while providing the communication link 16 between the sites 12 and 14 would enable communication between these sites, the configuration database for one site would still not reflect the configuration of devices within the other site and there is no way for a configuration application to integrate configuration components stored in separate configuration databases into a signal configuration hierarchy or tree, such as that of FIG. 2.

Also, prior art configuration applications typically access the configuration database to obtain the information being requested by the user every time the user performs a drilling down operation or other request for more information within the configuration hierarchy. Unfortunately, the actual data reads from the configuration database are the slowest part of the data retrieval process and, thus, with a large number of users, each viewing the configuration hierarchy, the reads into and out of the configuration database could cause undue delay in being able to access this information from a single database. This fact is exacerbated when more users are added to the system via one or more remote communication links, which increases the number of users capable of accessing the configuration database. Likewise, the data retrieves for these remotely located users may be further delayed by the bottleneck in communications associated with the remote link, such as the communication link 16 of FIG. 1.

The databases 30 and 54 and communications within the process control system 10 can be structured in a number of ways to provide configuration information about the process control system 10 to numerous configuration applications at one or both of the local site 12 and the remote site 14 and yet in a manner that reduces the amount of communication over the remote link 16, that provides an integrated view of all or any part of the process control system 10 and that allows the configuration information to be changed from any location within a process control system 10. In a first case, one of the configuration databases, such as the configuration database 30 of FIG. 1, is designated as a master configuration database that stores the master copy of all configuration items or components therein. The other configuration database 54 is what is referred to herein as a briefcase database which accesses some or all of the information within the master configuration database 30 on an as needed basis, downloads this data via the communication link 16 and enables user interfaces or other devices at the remote site 14 to view and change that data. Changed data can be uploaded to the master configuration database 30 via the communication link 16 to assure that other users have access to the changed data via the master configuration database 30. In this case, calls by individual user interfaces to the master configuration database 30 via the slow or low bandwidth communication link 16 are reduced because all of the needed configuration data can be downloaded to the briefcase database 54 and accessed from this database 54 at the remote site 14. Furthermore, the process of downloading a large number of configuration components to the briefcase database 52 at one time is more efficient in terms of usage of the communication link 16 than trying to download this information piecemeal.

In another case, the configuration database 54 may be a mirror database that mirrors the state of the master configuration database 30. When created, the mirror database 54 copies all of the data from the master configuration database 30 to mirror the state of the database 30. According to this strategy, a routine within, for example, the mirror database 54, periodically accesses the master configuration database 30 via the slow communication link 16 and synchronizes with the master configuration database 30 by providing changes made in the mirror configuration database 54 to the master configuration database 30 and by copying changes made to the master configuration database 30 to the mirror configuration database 54. Here, the users at the main site 12 access the master configuration database 30 while the users at the remote site 14 access the mirror configuration database 54 which reduces or eliminates the number of data calls made by individual users over the slow link 16.

In still another case, different portions of the configuration data are stored in the configuration databases 30 and 54 to create a distributed configuration database. A configuration application executed in a user interface or other device will access the configuration components which the user wishes to view or to manipulate from the database in which this data is originally stored and will subscribe to changes to these components. In one embodiment, subscription links or threads are established between each user or client and each of the databases that the user or client is accessing to retrieve configuration data. For configuration data that is stored in the configuration database 54 and subscribed to by the user interface 53 (both at the remote site 14), the thread does not require communications via the communication link 16. However, for data that is stored in the configuration database 30 and that is subscribed to by the user interface 53 (which are at different sites), the thread requires communication via the communication link 16. As a result, it is desirable to store each piece of configuration data in a configuration database located at the site or other location from which this data is most likely to be accessed. The particulars of this scheme will be described in more detail later.

The techniques described herein provide a way for a user to make configuration changes to a remote system over a slow or remote communication link in the presence of a lot of noise, which may cause a lot of retries. These techniques also provide a mechanism for users to configure parts of a process control system that are disconnected from the main network or to configure multiple process control systems from the same configuration machine. These techniques also enable multiple users to work on the configuration of different parts of a system remotely, which can improve the overall concurrency of development of a process control system.

The concept of a briefcase database for use in a process control system will now be described with respect to FIGS. 3–5. Generally speaking, the process control system using this structure is designed to have a master configuration database that stores all of the configuration data for all the sites of a process control system, including a main site and different remote sites. The main site and the remote sites may be communicatively connected via a slow or low bandwidth communication link like a satellite or cellular link, may be intermittently connected via a modem or telephone line link or may not be connected at all but rely on a portable computer or other portable memory to transfer configuration data from one site to another. Typically, the main site includes the master configuration database while each remote site, or the laptop or other computer that connects the main site to the remote site, includes a briefcase database that stores a copy of some or all of the configuration data within the master configuration database to be used at the remote site.

The briefcase configuration database is initialized from the master configuration database by a user through download and reserve operations. In a download operation, the briefcase database copies or receives a download of the portions of the configuration data within the master configuration database that are needed to work on, restructure, change, tune, debug, etc. a remote site. The download operation can automatically download all of the configuration information needed by a user to perform a desired operation at the remote site, to view the state of the remote site, etc. A list of all of the configuration components needed for any operation may be created, stored and used to perform the download. Alternatively, a user may be allowed to select the important configuration objects needed for the activities at the remote site and some or all of the children and/or parents of these selected components may be automatically downloaded to the briefcase database. If desired, however, the user may select the specific components to be downloaded.

A reserve operation is used to prevent configuration data from being changed within the master configuration database while this data is being used by the briefcase database. Only items that have been reserved within the master configuration database by a briefcase database can be changed at the remote site. To reserve an item, a configuration application may send a reserve message to the master configuration database, which then marks this item in the master configuration database as reserved and prevents other users from making changes to the item within the master configuration database. The item may optionally be locked when reserved to prevent reads of this item. Such a locked states prevents others from editing or reserving this item. Of course, the download and reserve operations may be performed via a slow, low bandwidth, or intermittent link as desired. However, because all of the configuration data is downloaded together or at the same time, such a download is more efficient than obtaining copies of the data from the master configuration database via a slow or low bandwidth link on an individual basis, as needed.

After downloading and reserving configuration items, the briefcase database is taken to the remote site (if the briefcase database is not already at the remote site) and is used by a configuration application at the remote site to perform configuration activities. Because all of the configuration information needed to perform a particular operation has been provided to the briefcase database, the briefcase database can be used directly at the remote site or can be used to create a local database at the remote site and this local database can be used by any configuration application executed at the remote site.

Typically, configuration applications that use the briefcase database can only edit items that have been reserved from the master configuration database by that briefcase database. For example, if a user has reserved a module with a linked composite, the master configuration database will transfer the module plus all of the dependencies or children of that module into the briefcase database and only reserve the module. Of course, the linked composites can be reserved in the same manner as the module. If a user needs download capability, then the system will also allow the users to reserve download rights on specific nodes and exchange configuration information, including download records and status information for those nodes, with the briefcase database. If desired, the configuration application that uses the briefcase database may display configuration data stored in the briefcase database in a manner that clearly indicates the items which the user can edit. For example, editable items may be identified on the configuration hierarchy tree in solid type and all items that the user cannot change can be displayed as being greyed out. Of course, other manners of illustrating which items or components have been reserved can be used as well. As noted above, master configuration database items that have been reserved are locked in the master configuration database so that no changes may be made thereto other than by a promote operation (described below) generated by the briefcase database that reserved those items.

After the user has made changes to the reserved items within the briefcase database, the briefcase database can then be synchronized with the master configuration database through a promote operation, wherein changes made to reserved configuration components are released back to the master configuration database. In particular, a promote operation promotes configuration items that have been reserved from the master configuration database back to the master configuration database where these changes are reflected or are stored in the master configuration database. Such an operation can, if desired, un-reserve the item within the master configuration database. A configuration application may send a promote message to the master configuration database along with the values or changes to the items being promoted all at once, to reduce the load on the slow communication link. Of course, the operations of reserving and promoting can be carried out on single items of configuration data such as, for example, library items, modules, nodes, cards, etc., or can be carried out on whole sections of a tree, such as on a parent and all of its children and sub-children.

If desired, a configuration application may synchronize an entire briefcase database to the master configuration database by, for example, exporting the reserved items from the briefcase database, zipping the export file and transferring the zipped export file to the node with the master database thereon (i.e., via the slow or low bandwidth communication link). At the master database, an application may unzip the export file, import this file into the master database in any known or desired manner, extract the current structure for the master database into the textual or data format used in the master database, zip the export file, and transfer the zipped export file back to the node having the briefcase database. The application at the briefcase database then unzips the export file and imports this unzipped file back into the briefcase database. This process will assure that all of the items within the master configuration database and the briefcase configuration database are the same.

Figure 3:
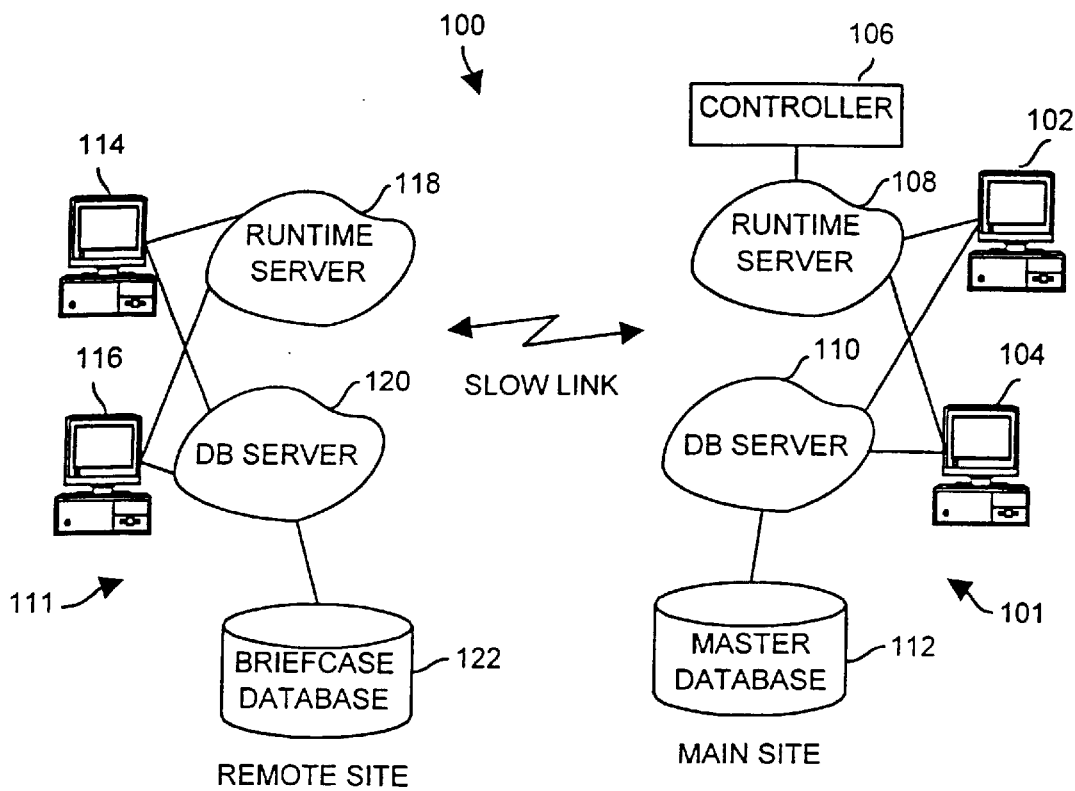
FIG. 3 is a block diagram of a process control system having a main site and a remote site which are connected via a slow communication link and which share a common master configuration database.

Referring now to FIG. 3, a process control system 100 which uses a briefcase database as described above for configuration activities is illustrated. The process control system 100 includes a main site. 111 having user interfaces 102 and 104 connected to a controller 106 which performs control activities. The user interfaces 102 and 104 are also connected to a runtime data server 108 and to a configuration database server 110 which communicate with a remote site 111 via a slow communication link, such as a satellite link, a modem link, a cellular link, etc. The main site 101 also includes a master configuration database 112 that is accessible by the database server 110. Similarly, the remote site 111 includes user interfaces 114 and 116 connected to a runtime server 118 and to a configuration database server 120 which communicate with the main site 101 via the slow link. The remote site 111 also includes a briefcase configuration database 122. The briefcase configuration database 112 can be used as a local database for remote site 111 and may obtain configuration information over the slow link from the master configuration database 112 at the main site 101.

Using a configuration application that provides remote browsing, reserve, and synchronize operations from one of the user interfaces 114 and 116, an engineer can download configuration information from the master configuration database 112 to the briefcase database 122. As part of this procedure, the user can be given the opportunity to copy the master database 112, copy the tree structure for the master database 112, or create the local or briefcase database without copying any structure from the master database 112. At this time, the user at the remote site 111 can also reserve, within the master configuration database 112, some or all of the downloaded information to be able to make changes to that information and to prevent others from trying to change that information within the master database 112. Preferably, the download operation provides all of the needed configuration information at once over the slow communication link, which is more efficient than obtaining this data piecemeal over the slow link.

Thereafter, the user can configure the remote site 111 or elements thereof using a configuration application and the briefcase database 122 at the remote site. If desired, the user could also or instead configure portions of the main site 101 from the remote site 111. At this time, the configuration application executed in, for example, the user interface 116, may access the briefcase database 122 and display or otherwise use the portions of the configuration hierarchy or tree stored within the briefcase database 122. If the user wishes to see the structure in the master database 112, the user can run a synchronization operation which queries the master database 112 via the slow link for all of the information therein, for the tree structure, or for any other desired portion of the configuration information within the master database 112 and updates the briefcase database 122 with this information. When finished with the configuration activities for reserved item(s), the user may promote the changes made to the reserved item(s) back to the master database 112 via the slow link to cause the changes to be stored in the master configuration database 112.

Figure 4:
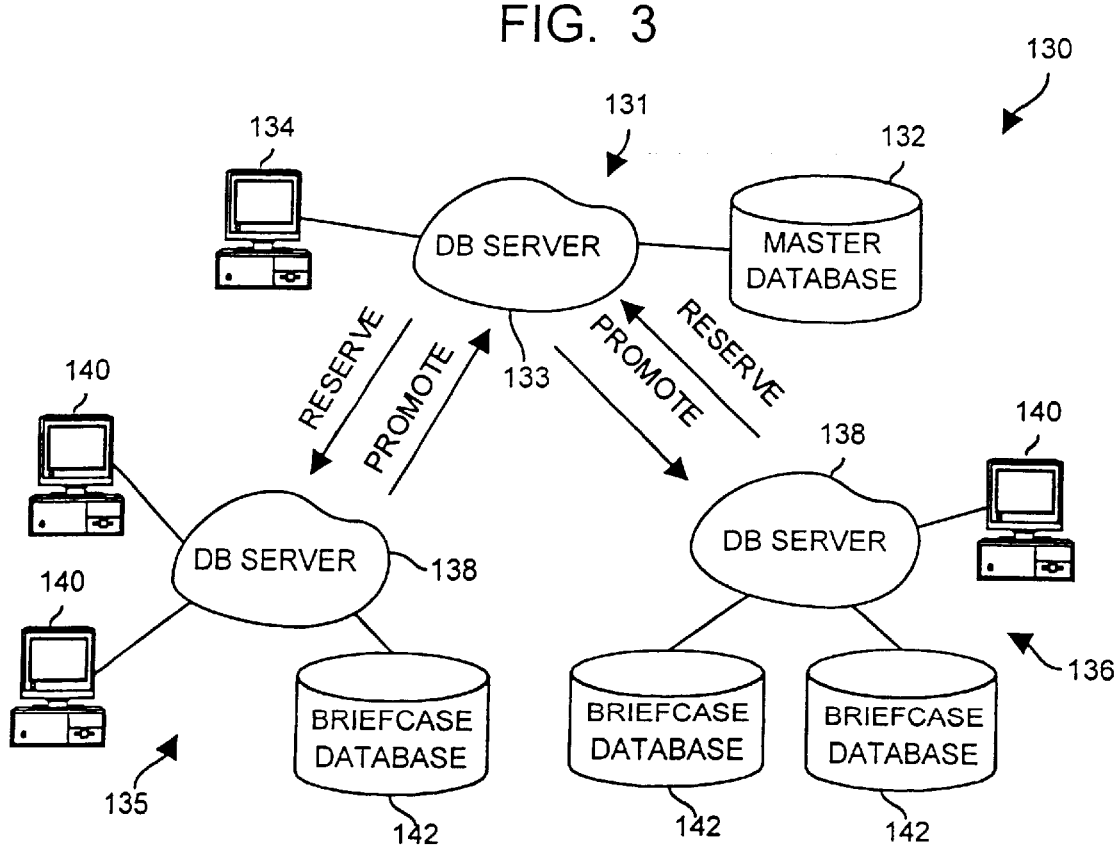
FIG. 4 is a block diagram of a process control system having a main site and two off-line sites, all of which share a common master configuration database.

Referring now to FIG. 4, one or more briefcase databases may be used to perform configuration activities from disconnected workstations. In particular, FIG. 4 illustrates a process control system 130 that includes a main site 131 having a master configuration database 132, a configuration database server 133 and a user interface 134 associated therewith. Remote sites 135 and 136 similarly each include a database server 138, one or more user interfaces or workstations 140 that may execute configuration applications and one or more briefcase configuration databases 142 that may be used to perform configuration activities on any of the items in the master configuration database 132. If desired, the briefcase database 142 may be within one of the user interface devices 140. Similar to the system of FIG. 3, users at the workstations 140 may use a configuration application executed in, for example, one of, the interfaces 140, to connect to the master database 132, download configuration information therefrom, and reserve within the master configuration database 132 all of the items that are to be changed. Such a download can be performed over a slow link or via an intermittent connection, such as a dial up connection, or via a portable removable physical connection, such as a laptop computer. In any event, the different sites 135 and 136 download some or all of the same configuration information from the master configuration database 132 to the briefcase databases 142. However, the users at the different remote sites 135 and 136 may reserve separate items to be changed.

After a download procedure has been performed, configuration applications may be executed on the workstations 140 to change or modify the items that have been reserved within each briefcase database 142 and, at some point, changes to these reserved items may be uploaded back into the master configuration database 132 using a promote procedure. In this manner, the briefcase databases 142 may be used on workstations 140 which are totally disconnected from the main network 131 or that are connected via a slow communication link so that, for example, an engineer can pull items into the workstation 140 to work on elsewhere, change these items and promote the newer versions of these items back into the master database 132 at a later date. By enabling a number of different briefcase databases 142 to be created at the same time, concurrent engineering can be enhanced. In particular, each briefcase database 142 may contain a subset of the configuration within the master configuration database 132 so that the configuration operations can be logically divided, assigned to and completed by different engineers.

If desired, new configuration data can be periodically promoted back to the master database 132 to enable data to flow between the different briefcase databases 142. For example, in practice, one engineer may work on a piece of equipment and another may work on the control module operating on that equipment. The latter will need the final version of the equipment configuration component before completing the control module configuration component. However, the final equipment definition can be pulled from the master database 132 after the first engineer has completed work on the equipment definition and has promoted the contents of this definition back into the master database 132.

Figure 5:
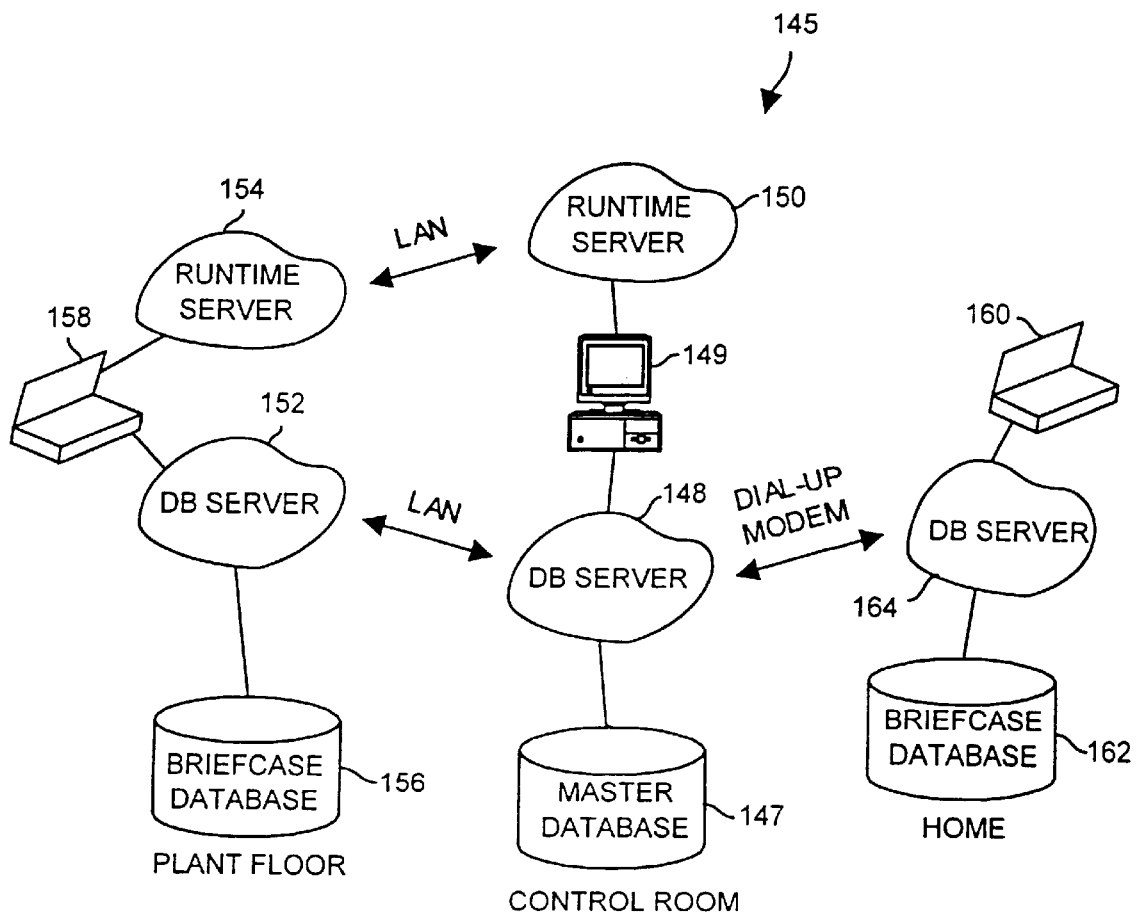
FIG. 5 is a block diagram of a process control system having a control room connected to a plant site via a local area network and connected to a user interface via an intermittent communication connection, all of which share a common master configuration database.

FIG. 5 illustrates another example process control system 145 in which briefcase databases may be used advantageously. The process control system 145 includes a control room having a master configuration database 147 connected to a database server 148, a user workstation 149 and a runtime server 150. The system 145 also includes a plant floor having a database server 152 and a runtime server 154 connected to the control room via a LAN connection, which may be any type of LAN connection including a shared LAN. The plant floor also includes a briefcase database 156 that may be connected to or disposed within, for example, a laptop 158 or other computer, user interface or workstation used by, for example, a plant technician or an engineer to make changes on the plant floor. The user at the plant floor can run a configuration application from the computer 158 to obtain items of the configuration data stored in the master database 147 via the LAN and to reserve at least some of these items. Thereafter, once the reserved items as well as any other items needed by a configuration application to make configuration changes on the plant floor are downloaded to the briefcase database 156, the user at the plant floor can run the configuration application using the local or briefcase database 156 to make changes to the reserved items and can then promote these changes back to the master database 147 via the LAN. This process eliminates the need to make numerous calls over the shared LAN to the master database 147, which is inefficient.

Simultaneously, a user at a home may have a computer 160 and a briefcase database 162 connected to the master database 147 via a database server 164, which may be, for example, a dial-up modem. This user can obtain configuration data from the master database 147 via the modem 164 and store this information in the briefcase database 162, reserving the items this user may want to change. The user at the home can then execute a configuration application that operates on the configuration information within the briefcase database 162 at his or her leisure and promote changes back to the master database 147 via the dial-up modem when complete.

If desired, a user can download or place information pertaining to different process control systems, sites, etc. in the same briefcase database if, for example, the user wishes to make changes to two different process control systems. In such a situation, multiple briefcase databases may be stored in one computer and this one computer can be used to configure different sites of the same process or to configure different sites associated with different processes. Typically, such a computer will be a laptop or other portable computer that stores and executes configuration applications and that includes a configuration database and associated database loading and access applications.

If desired, the master database of any of the systems of FIGS. 1 and 3–5 may automatically store a revision history of configuration items therein to provide source control for changes to configuration items. Similarly, items in the briefcase database that have been modified may be displayed as having a visual tick attached thereto to indicate the briefcase version has been modified and that a promote activity needs to be performed.

Instead of providing a briefcase database, a mirror database may be kept at remote sites of a process control system. The mirror database extends the briefcase model by keeping two databases, i.e., the remote database and the master database synchronized, which may be desirable in, for example, onshore/offshore process control configuration where editing a database over a slow link is not feasible. The mirror database may also be used to support redundancy. In the mirror database, all the configuration items including, for example, library, setup and control data, are subscribed to by the mirror database from the master database. Such a subscription may be implemented in the manner described in connection with FIGS. 7–15 herein if desired. Furthermore, a configuration item is automatically reserved from the master database when this configuration item is edited in the mirror database. Thus, an edit in the mirror database automatically sends a message over the slow communication link to the master configuration database to reserve that item. If the reserve operation fails due to a lock of that item within the master configuration database, then the edit in the mirror database is prevented. At some point later in time, after a change is made in the mirror database, the configuration item is promoted from the mirror database back into the master configuration database. Such a promote activity may be accomplished automatically when a change is made, periodically on a timed basis, such as every 10 minutes, or manually in response to a user command to perform a promote activity.

Conversely, due to the subscription by the mirror database to the master database, changes to the master configuration database are immediately pushed or sent to the mirror database over the slow communication link. With a mirror database, both databases can operate independently when the communication link is down. However, modifications to the databases must be manually merged when the communication link is restored. In general, multiple mirror databases can exist as subscribers to the same master database. Due to the subscription nature of the connection between the mirror database and master database, once the mirror database is established, only changes to data within the mirror database and the master database need to be sent over the slow or low bandwidth communication link, which is more efficient than trying to download configuration data piecemeal as needed by each of the users of the mirror databases.

Instead of having a single master configuration database and one or more briefcase or mirror databases that may be periodically synchronized to the master configuration database, or in addition to this setup, a configuration database may be distributed throughout different portions of a process control system so that different components of the configuration data are stored in different physical databases located at different physical sites of the process control system. This distributed configuration database may be used to enable the configuration information associated with two or more geographically separated sites or locations to be integrated together and to provide a seamless view of the entire process control system, wherein this seamless view may include any or all of the process control configuration components in the each of the different sites or locations.

Figure 6:
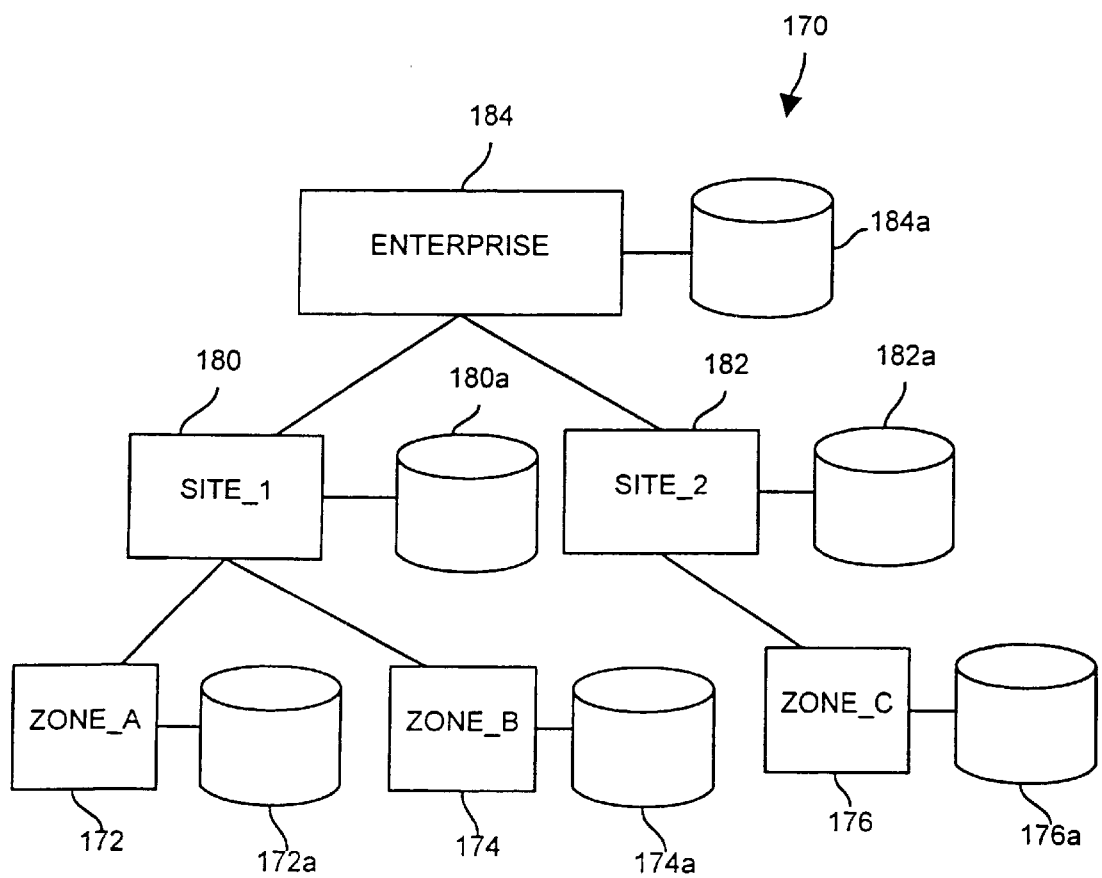
FIG. 6 is a block diagram of a distributed configuration database system used in a process control system having different geographically separated portions communicatively connected via slow or low bandwidth communication links.

FIG. 6 illustrates a process control system 170 as having a hierarchy of configuration databases associated with different logical and/or physical locations. The process control system 170 includes three zones named Zone_A 172, Zone_B 174 and Zone_C 176, two sites named Site_1 180 and Site_2 182 and an enterprise network 184. The zones 172 and 174 include configuration databases 172a and 174a, respectively, and these zones are communicatively connected via, for example, a satellite, a modem or other slow, low bandwidth or intermittent communication link, to the site 180 (as indicated by the lines between the zones 172 and 174 and the site 180). Likewise, the zone 176 includes a configuration database 176a and is communicatively connected via any desired communication link to the site 182. Still further, the sites 180 and 182 include configuration databases 180a and 182a, respectively and are connected to the enterprise system 184 via any desired communication link. The enterprise system 184 also includes a configuration database 184a.

A zone, such as any of the zones 172, 174 and 176, is typically a logical and, in many cases, may be a physical division of a large control system. Thus, a zone generally can function with no connection to the outside world. A zone may, for example be any traditional process control system having interconnected devices at a particular geographic location. A site, such as either of the sites 180 and 182, is a logical definition of an area, region, etc. and may have any number of zones associated therewith. The enterprise system 184 is the highest level system in the configuration database hierarchy within the process control system 170 and is communicatively connected to each of the sites and, thereby, to each of the zones within the process control system 170. Of course, other sites, zones and areas, or other logical units could be interconnected into the hierarchy of the process control system 170 via slow or other communication links and the different geographical locations of a process control system may be interconnected in other manners so long as the configuration database of any zone, site, area, etc. is accessible from any other zone, site, area, etc. via one or a series of two or more communication links. Still further, while the distributed configuration database hierarchy of FIG. 6 includes three levels (zones, sites and the enterprise), two levels or four or more levels could be used instead.

As illustrated in FIG. 6, each portion of the process control system 170 has a configuration database associated therewith and the configuration information for the entire process control system 170 or the different elements thereof is distributed throughout the databases 172a, 174a, 176a, 180a, 182a and 184a. In a preferred embodiment, the configuration data or configuration components are stored in the configuration database for the lowest level in the hierarchy made up by the enterprise, sites and zones for which that data is uniquely named. Thus, for example, library data, which may store templates of devices and software elements that can be used anywhere in the process control system 170, will typically be stored in and accessible from the highest level in the hierarchy, i.e., in the configuration database 184a of the enterprise system 184. Similarly, information pertaining to the library components and the system configuration of a site may be stored in the configuration database of the site while configuration information pertaining to particular devices, control modules, etc. in a zone will be stored in the configuration database of that zone. Furthermore, control configuration information will typically be stored in a zone configuration database because this configuration information relates directly to physical devices within that zone. Generally speaking, the goal is to store any particular piece of configuration data in the configuration database of the hierarchy of databases where this configuration data is most likely to be accessed or in a manner that any particular piece of configuration data can be found easily by users at other locations of the process control system 170.

According to the distributed configuration database strategy depicted in FIG. 6, a configuration application run within any one of the zones, sites, areas, etc. of the process control system 170 will access configuration data from one or more configuration databases that may be located at the same site, zone, etc. and/or at other sites, zones, etc. and will access that data as necessary to illustrate the current state of the process control system 170 or to perform some other configuration operation. As will be understood, a configuration application executed from any of the zones, sites or the enterprise system of FIG. 6 is able to access the configuration data stored in any of the different configuration databases to produce a view of the current configuration of any part of or of all of the process control system 170 and may be able to reconfigure any of the elements within any of the sites, zones, etc. of the process control system 170. A distributed configuration database, such as the one illustrated in FIG. 6, tends to decrease the amount of communication that needs to occur over the slow communication links because, typically speaking, users at a site or zone are more likely to view, use and change the configuration data of that site or zone rather than of a different site or zone, which means that most of the reads from and writes to the configuration database within a site or a zone will come from user interfaces within that site or zone while fewer such reads and writes will come from other zones or sites via one or more slow communication links. However, all the configuration information for any part of the process control system 170 is still available to user interfaces or other devices in any other part of the process control system 170.

To enable communication between different zones, sites, etc., each database within the system may store information pertaining to the general set up of the configuration hierarchy. For example, each database may store some object roots that are common to the configuration in all locations, and store pointers that indicate the specific database that has further configuration information about these roots or that indicate the next database to ask for this information. Thus, a user in Zone_A 172 may try to access a root object and request children of that root. In response, the configuration database 172a may find the database that stores the children by looking at a pointer for the selected root, and this pointer may indicate that the data for that root must be accessed from the enterprise database 184a or that the Site_1 database 180a should be accessed for further pointers to that data. The database 172a can the cause a read of the database 180a over a slow link, which may cause the database 180a to perform a read of the enterprise database 184a. Of course, it is possible that the enterprise database 184a will need to access the Site_2 database 182a which may need to access the Zone_C database 176a for the data. Alternatively, browser or sniffing applications may be provided at each database to enable, for example, the Zone_A database 172a to browse the Site_1 database or other databases to find the location of any particular piece of configuration data within the distributed configuration system 170.

If desired, each database within the system 170 may store a local copy of data that is stored originally at a different site, zone, etc. In particular, when a request for data that is not stored in a particular database is received, the database may retrieve that data from a different database and, upon retrieving this data, may store it locally to be used by users connected directly to the database (such as users in the same site or, zone) or to be sent to in response to requests by other databases within the database hierarchy. Thus, in the example above, each of the databases. 180a, 184a and 182a may store a local copy of configuration data originally stored in the Zone_C database 176a because that data was requested by the Zone_A database 172a or a user in Zone_A.

Because some or all of the configuration data for a particular configuration view displayed on any user interface may have to be accessed via one or more slow communication links, it is possible to run into a situation in which configuration data displayed on a particular user interface becomes stale or out of date based on changes made to the configuration information by another user, either in the same site or zone or in a different one. While each configuration application could periodically access the appropriate configuration database to refresh the configuration information being presented on a screen, this periodic refreshing would substantially increase the amount of communications that must occur over the slow communication links and would also increase the reads from the configuration databases, which slows communications within the process control system 170 and adds to the load of each of the configuration databases therein.

To overcome this problem, each configuration application that is accessing configuration data may subscribe to the appropriate configuration database for each configuration component being displayed on the screen (or otherwise being used) and the configuration database that stores this data automatically notifies each subscribing configuration application (client) of any changes made to the information within the configuration database. These changes may then be automatically sent to the client to be, for example, displayed on a user screen, or the changes may be requested by the user. In this manner, the configuration information being used by each configuration application, e.g., each piece of information being illustrated on each screen, is up to date no matter where the client application that uses this information is located within the process control system 170.

Of course, when a client application no longer needs a particular piece of configuration information, such as when a user no longer wishes to view a particular piece of configuration information in a configuration hierarchy, the configuration application de-subscribes from the configuration database that stores that piece of information so that change notifications and updates are no longer sent back to the subscribing configuration application. In this manner, the configuration application finds the configuration database that stores each piece of configuration information within, for example, the tree 65 of FIG. 2, retrieves that information through one or more slow communication links if necessary, subscribes to each piece of information therein to receive updates made to that information within the configuration database in which that information is stored and, upon receiving updates to the displayed information (which may be caused by another user making a change to the configuration of the system being viewed), displays the new or updated information. If a user or operator drills down into a section of the configuration tree being displayed, the configuration application accesses the new information, subscribes to this information and displays this information in the same manner. If some of the displayed information is dropped from the user screen, the configuration application de-subscribes from the data that was dropped.

If desired, all of the configuration information obtained (e.g. viewed on the screen of a particular user interface) may be stored in a local cache or memory associated with a configuration application being run or may be stored in the configuration database within the zone, site, etc. in which the application is being run so that, if a connection to the appropriate database is lost, the user or users at that site, zone, etc. may still pull this configuration information up from the local cache. However, this information may be displayed in a manner that indicates that this information comes from the local cache (such as being displayed in a greyed-out state) so that the user knows that this information may not be current. Using such a local cache to store configuration data already obtained via one or more slow links enables a user to view any configuration information that was already viewed or accessed by that user if a communication line or link goes down. Also, if the user wishes to view information that was dropped from his or her screen, this information may be pulled from the local cache to make it appear more quickly while the connection to the appropriate configuration database for that information may be reestablished to update that information.

While FIG. 6 illustrates each of the sites and zones as being interconnected by a slow link, such a set up is not necessary. For example, the configuration database for a site may be located in a zone and may be directly accessible from that zone while being accessible via a slow communication link to other zones associated with that site. For example, to establish a distributed configuration database, such as that illustrated in FIG. 6, a user in Zone_A 172 may create a site database (i.e., the Site_1 database 180a) on the same machine as the Zone_A database 172a or on a different machine connected to the Zone_A database 172a via a direct high speed connection. Alternatively, the Site_1 database 180a may be connected to the Zone_A database 172a via a slow link. The user publishes some or all of the libraries and setup data in Zone_A to the Site_1 database 180a and/or to the enterprise system database 184a. Thereafter, the database 172a in Zone_A 172 may automatically subscribe to one or more of the configuration items within the Site_1 database 180a, the enterprise database 184a, etc. when a user or a configuration application within Zone_A 172 needs or wants to access those items. If desired, any configuration database of the system 170 could always subscribe to some or all of the configuration information within one or more of the other configuration databases of that system.

Next, a user in Zone_B 174 may select the Site_1 database 180a created by the user in Zone_A as the site database for Zone_B 174. The user in Zone_B 174 then subscribes to some or all of the libraries and setup data in the Site_1 database 180a which may result in conflicts where an item with the same name exists in the Site_1 database 180*a* and the Zone__B database 174*a*. A configuration application may notify the user in Zone__B 174 of this problem and the user in Zone__B 174 may be given the option of renaming a local item before subscribing to items in the Site__1 database 180*a* or of overwriting the local item. Additionally the user in Zone__B 174 may publish items to the Site__1database 180*a* and, thereafter, Zone__A 172 is notified of the additions to the Site__1 database 180*a* to which Zone__A subscribes and may then subscribe to these additional configuration items. Of course, the enterprise/site hierarchy is configured in a similar manner to thereby enable communication between the sites 180 and 182 and between the zones 172, 174 and 176.

To establish a connection between Zone__A 172 and Zone__C 176 when, for example, a user in Zone__A 172 wishes to view configuration components stored in the database 176*a* of Zone__C 176, the Zone__C database 176*a* will publish this data to the Site__2database 182 which subscribes to this information and which publishes this information to the enterprise system database 184*a* which subscribes to this information from Site__2 182. Site__1 180 subscribes to this information from the enterprise database 184*a* while Zone__A 172 subscribes to this information from the Site__1 database 180. The established subscriber relationships may then be used to notify a client or user in Zone__A 172 of changes to configuration components stored in the Zone__C database 176*a*. As indicated above, a zone, a site, etc. can subscribe to items individually or to a whole sub-tree of objects including parents and all of the associated children. Subscription may also entail taking a copy of the items, adding these items to the local zone configuration database and establishing an ongoing communication relationship between the published items and the local copies. The publisher database may keep track of the subscribers while the subscribing databases keep track of where the original information is stored. This source/destination information can be used to direct reservation of items within a configuration database and to make changes from remote locations. Likewise, this information may be used to re-establish the publish/subscribe relationship if a database has to be restored from backup.

Of course, because communication between zones cannot always be guaranteed due to the presence of the slow communication links between zones, the zones will continue to function independently when communication links are down. However, when communication is re-established any conflicts must be resolved manually.

It will be understood that communications between zones, sites and the enterprise may be performed on a publish or subscribe basis wherein the configuration database that has a master copy of the configuration item publishes that item when one or more subscribers subscribe to the item. The subscribers may be, for example, configuration applications being executed in user interfaces (e.g., workstations or other computers) within different sites or zones, may be databases within these sites or zones, which databases are used by configuration applications executed in those zones, or may be any other device or application which uses the configuration data. The items within a database that can be subscribed to by other sites or zones are called shared objects. Of course, different kinds of operations may be performed on shared objects, such as 1) browse, in which a subscriber configuration application views the list of shared objects available from the publisher, 2) subscribe, in which a subscriber configuration application requests a local copy of the shared object for use in configuration activities at the subscriber location, 3) copy to local object, in which a subscriber configuration application copies an item to a non-shared local object or database, 4) delete, in which a subscriber configuration application deletes the shared instance in the publisher, 5) un-subscribe, in which a subscriber configuration application breaks the subscription link between the local copy of the configuration item at the subscriber and the publisher copy, 6) pull changes, in which the subscriber configuration application retrieves the latest version of the shared item from the publisher, 7) reserve, in which the subscriber configuration application locks a shared object in the publisher database to prevent this object from being changed by another user, and 8) promote in which the subscriber configuration application pushes changes made to a reserved item back to the publisher database. These operations may be performed by sending messages between the subscriber and publisher and executing software in the subscriber location and the publisher location to deal with the messages and to take appropriate actions as defined above.

From a configuration perspective, there are several inter-zones activities that may be performed, including sharing setup and library data between zones, browsing or viewing setup, library and configuration data from another zone, configuring inter-zone references and namespace co-ordination between zones. In one embodiment, configuration objects or items are shared from the immediate parent within the hierarchy. For example, zones 172 and 174 share a composite definition from the site 180 and all zones share a common enumeration set from the enterprise system 184. Zones 172 and 174 subscribe to the definitions in the site 180 while the zone 176 subscribes to the definitions in the site 182. Likewise, both sites 180 and 182 subscribe to common definitions in the enterprise system 184.

Browsing services are provided within a configuration application to find a server in the enterprise/site/zone hierarchy and to browse the configuration database associated with one of those locations. Browsing services are used to set up subscription to shared objects and to configure inter-zone references. In particular, browse information is queried from a remote server upon user request and is cached locally. Browse roots may be detected by sniffing the network or may detected using any other desired or known browsing technique. The knowledge of detected or configured browse roots may be persistent and, thus, will remain cached through a power cycle. The existence of these configuration object roots enables a user to browse down to other information associated with the roots to find the location of or the path to this information within the distributed configuration hierarchy.

Inter-zone references may be configured by entering the reference directly or by browsing to an attribute in a remote database. References may take the form of, for example, "//ZoneName/Tagged1tem/ . . . /AttributeName" or any other desired form. It will be understood that zone names must be unique within an enterprise hierarchy to resolve inter-zone references. Within each zone, there is a namespace for tagged items and the configuration system may enforce uniqueness of tags within a zone. Thus, each configuration application may have a tool that determines whether a tag is unique within a site or the enterprise at a given moment in time to enforce uniqueness in naming within the distributed configuration database.

If desired, security between zones may be provided in any desired manner and a zone administrator may grant privileges to access shared objects for a user, group, etc. Such privileges may include the ability to browse and subscribe to shared objects, the ability to pull changes from a publisher for objects or configuration items and the ability to reserve, modify and promote changes.

Still further, if desired, different zones may use different languages which may be beneficial in, for example, Europe, where companies span regions using many different languages. In this case, enumerated values may be passed between zones as numeric values or as a local data string (such as a word) which may be displayed along with a numeric value that is common throughout the process control system for the same word or phrase in different languages. In this manner, a user may identify the enumerated value, command, etc. by its corresponding number, which enables ease of conversion from one language to another. In any event, to browse a database that uses a different language requires that the relevant font be installed on the browsing machine or zone. In one embodiment, inter-zone references are configured in the language of the remote zone and Unicode strings are used throughout the system exclusively to enable detection or conversion of any character in any language supported by Unicode. In this case, a single database may handle storing strings of multiple languages and database export files are exchanged in Unicode format. In other words, files from different locales are imported into each database using the Unicode format.

To assure that modifications can be performed without interference, modifications to shared data may be subject to a reserve/promote procedure described above. In this case, before an item can be revised, the modifying user must reserve this item into the zone of the modifying user. Only one user or zone can reserve an item at any particular time. After an item has been reserved, changes are made to the item in the local database which has reserved this item, such changes being made as a result of new configuration activity by the user who reserved the item. Thereafter, the item or group of items that have been reserved and modified are promoted back to the configuration database where this data is stored as the master set of data. Such a reserve/promote procedure assures that two users cannot try to change the same item at the same time. Instead, the second user to try to reserve the item is prevented from making any modifications until the first user to reserve the item has promoted the changes to the item back to the configuration database which stores the master version of that item.

Generally, two modes of subscription may be used. In the first mode, referred to herein as a safe subscription mode, new shared items are automatically pulled into a subscribing zone or site while modifications to and deletions of items that already exist are pulled manually, i.e., a direct command from the user is required to perform the pull of the changed or deleted information. In this case, the user may be notified of a change to or deletion of a configuration to which the user system is subscribing and may be asked whether the configuration application is to pull that change to the local database. Alternatively, all modifications can be pulled automatically so that any changes to the shared database are imported into the subscribing databases without user intervention. It should be noted that, in the safe subscription mode, a change notification is not transitive through the entire hierarchy. Thus, for example, if an enterprise item is revised, the dependent sites are notified. However, it is not until the changes are actually pulled down to a site that the zones associated with that site are notified of the changes. As a result, the publisher, i.e., the database that stores the master copy of that configuration item, may keep track of whether a subscriber has taken the latest revision of an item and this information may be used to resynchronize the publisher/subscriber relationship if either database has to be restored from backup.

Furthermore, it will be understood that the failure of a subscriber to pull changes can lead to differences in the configuration hierarchy at lower levels in the configuration database hierarchy. For example, if the enterprise system 184 notifies the sites 180 and 182 of FIG. 6 of a change and if the Site_2 182 pulls this change while the Site_1 180 does not, then the configuration hierarchy viewed at the sites 180 and 182 will be different. Furthermore, upon the Site_2 182 pulling the change, a change notification will be sent to subscribers in the Zone_C 176 which can pull this change or at least know that a change has occurred. However the subscribers in the Zone_A 172 and Zone_B 174 will not know of the change because Site_1 180 has not pulled the change and, therefore, Zone_A 172 and Zone_B cannot pull the change. In this case, the configuration hierarchy available at the zones 172 and 174 is different than that available at the zone 176. If desired, a configuration application may be provided that displays the list of upstream and downstream dependencies to help the user see what is happening with respect to changes. When the user attempts to pull an item, the configuration application can detect any upstream revision mismatches and ask the user if these items should also be pulled.

Referring now to FIGS. 7–15, a system for efficiently accessing and distributing data from a database within a process control system will be described herein. Generally speaking, the database access system uses a shared cache to publish data stored in the database to one or more subscribers (also called clients) of that data and to provide update or change notifications to the subscribers or clients when changes to the data occur within the database. It will be understood that the database access system described herein may be used in any of the databases within a process control system, such as an of the configuration databases 30 and 54 of FIG. 1, any of the master configuration databases of FIGS. 3–5 or any of the configuration databases of FIG. 6. Likewise, the subscriber or client of the data within a database being accessed can be any other configuration database, any configuration application executed in any user interface within the system or any other application that uses the configuration data, and these clients may be communicatively connected to the database being accessed using, for example, a direct or high speed communication link, a slow or low bandwidth communication link or an intermittent communication link. Thus, for example, the clients described in FIGS. 7–15 can be located in any of the zones or sites of FIG. 1 and 3–6.

Generally speaking, each client communicates with a database server associated with a configuration database that stores the configuration components to which the client subscribes. At the start of the subscribing process, a client thread is established within the database server for each different client that connects to the configuration database and this thread provides access to one or more particular components within the configuration database. Thereafter, changes to the components within the configuration database are recognized and notifications of these changes and, if desired, the changes themselves, are sent back to each client that is subscribing to that configuration component. If a client un-subscribes from a configuration component, no change notifications are provided back to the client for that component. A client may also use a client thread to lock, reserve, promote to or otherwise make changes to the component.

It will be understood that the use the term "thread" refers to a processing path or a processing procedure performed by a processor within the database server and is a known technique of performing parallel processing. Generally speaking, a processor may execute multiple threads simultaneously by interleaving tasks associated with the different threads being executed. For example, the processor may perform, in order, the first step associated with a first thread, the first step associated with a second thread, the first step associated with a third thread, and then the second step associated with the first thread, the second step associated with the second thread, the second step associated with the third thread, and so on. Threads may be added or deleted without effecting other threads being executed. Threads may communicate with each other threads using inter-thread notices or messages. Also, data stored and used by different threads may be thread local, i.e., only known or capable of being accessed by the thread which created or stored the data.

Figure 7:
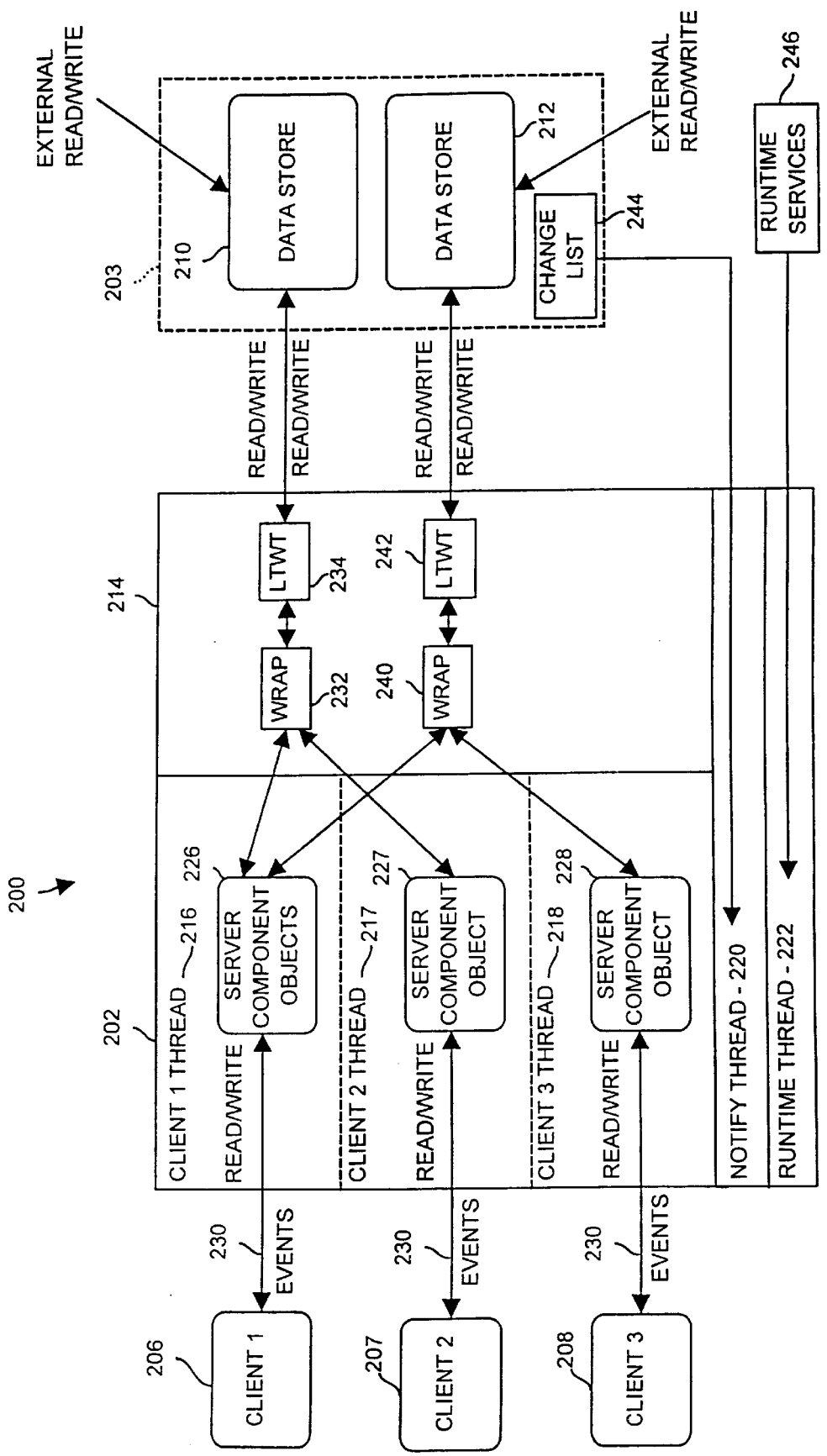
FIG. 7 is a block diagram of a configuration database client/server system that uses a shared cache within a configuration database server to implement subscriber/publisher communications between multiple clients and configuration components stored within a configuration database.

Referring now to FIG. 7, a block diagram of a configuration database communication system 200 which implements subscriber relationships between multiple clients and a configuration database includes a database server 202 communicatively coupled between a configuration database 203 and multiple clients 206–208. The configuration database 203 is illustrated as including two data stores 210 and 212, each of which stores a configuration component being subscribed to by one or more of the clients 206–208. While the database 203 is illustrated as having two data stores 210 and 212, it will be understood that the database 203 can have more or other data stores therein, with only two being shown for the clarity of illustration. Furthermore, it will be understood that any number of clients may access the database 203 using the server 202. Also, each data store 210 and 212 can be associated with a different physical database such that one server can be used to provide access to more than one different database.

The clients 206–208 communicate with the server 202 via communication links 213 which may be direct, high speed links such as an Ethernet connection or which may be slow, low bandwidth or intermittent links, such as satellite links, cellular links, modem links, etc. Each initial request for a configuration component by a client 206–208 creates a client thread within the server 202 and this client thread is used to provide the client 206–208 the requested component(s) from the appropriate data store(s) 210 and/or 212 using a shared cache 214 within the server 202, as will be described in more detail. A client thread can also be used to write changes to the data stores 210 and 212, to add component data to or delete component data from the database 203, and to perform locking of component data within the data stores 210 and 212.

Generally speaking, the shared cache 214 sets up a data memory object, called a lightweight, for each of the different data items within the database 203 being subscribed to at any particular time by any of the clients 206–208. Only one lightweight needs to be established for any configuration component within the database 203 and the client threads for all clients subscribing to that configuration component access the same lightweight. Thus, for the system of FIG. 7, a lightweight will be established within the shared cache 214 for each of the configuration components within the data stores 210 and 212 when at least one of the clients 206–208 subscribes to the component in the data store 210 and at least one of the clients 206–208 subscribes to the component in the data store 212. If each of the clients 206–208 subscribe to different configuration components, the threads for each client will include different lightweights tied to different data stores within the configuration database 203. However, when more than one client subscribes to the same component within the database 203, the threads for these clients will use the same lightweights within the shared cache 214. For this reason, the lightweights within the shared cache are not thread local.

Generally, whenever a first client first subscribes to a component within the database 203, a lightweight is established for that configuration component within the shared cache 214 and this lightweight reads and stores a copy of the configuration component from the database 203. Thereafter, every other client that subscribes to the same configuration component will have its client thread connected to the same lightweight, which means that the second, third, etc. client that subscribes to this configuration component can read the component from the lightweight instead of from the configuration database 203, which reduces the number of reads from the configuration database 203.

The database server 202 illustrated in FIG. 7 includes three client threads 216, 217 and 218 which perform different read/write activities for the clients 206, 207 and 208, respectively, and two notify threads 220 and 222 which perform notification activities with respect to the client threads 216, 217 and 218. Generally speaking, each client thread 216, 217 and 218 uses server component objects 226, 227 and 228, respectively, to communicate with the clients through the communication links 230. The server component objects within a particular client thread communicate with different lightweights within the shared cache 214 for each of the different components being accessed by the client and perform this communication using a component data wrapper associated with each such lightweight. Each component data wrapper controls access to an associated lightweight and can be accessed by more than one client thread.

In the system of FIG. 7, the client 206 is subscribing to the components within the data stores 210 and 212, the client 207 is subscribing to the component within the data store 210 and the client 208 is subscribing to the component within the data store 212. As illustrated in FIG. 7, the client thread 216 for the client 206 uses one of the server component objects 226 to communicate with a first component data wrapper 232 which, in turn, is connected to a lightweight 234 that communicates with the data store 210. When established, the lightweight 234 copies the data within the data store 210 and makes this data accessible to each client subscribing to this data. One of the server component objects 226 of the client thread 216 also communicates with a component data wrapper 240 which, in turn, is connected to a lightweight 242 that communicates with the data store 212. Similarly, when established, the lightweight 242 copies the data from the data store 212 and makes this data accessible to each client subscribing to this data.

The client thread 217 for the client 207 uses the server component object 227 to communicate with the component data wrapper 232 and, thus, with the lightweight 234 to thereby access the data within the lightweight 234, i.e., the data within the data store 210. On the other hand, the client thread 218 for the client 208 uses the server component 228 to communicate with the component data wrapper 240 to access the data within the lightweight 242 associated with the data store 212. Thus, in this configuration, the clients 206 and 207 subscribe to the same configuration component and, as a result, both of the clients 206 and 207 have access to the lightweight 234 for this component. Likewise, the clients 206 and 208 subscribe to the same configuration component and both have access to the lightweight 242 for this component. As a result, the lightweights 234 and 242 are each shared by two client threads, and enable sharing of the data within the shared cache 214 by different clients.

As will be discussed in more detail, the server 202 establishes the server component objects, the component data wrapper objects and the lightweights to create or expand a client thread when a client subscribes to a configuration component within the database 203. When created, the client threads 216, 217 and 218 are used by the clients to make reads from and writes to the server component objects 226, 227 and 228 which, in turn, make reads into and out of the shared cache 214 via the component data wrappers and the lightweights created therein. The shared cache 214 makes reads out of and writes into the configuration database 203 as necessary. While a different client thread is created for each client, each client thread may handle one or more subscriptions of component data for a client. Generally, a different server component object is created for each subscription of a component by a client.

The notify thread 220 detects changes made in the database 203 and, in particular, detects changes made to the data stores 210 and 212 for which lightweights have been created by checking the status of a change list 244 kept within the database 203. When a change has been made, the notify thread 220 causes a message to be sent back to each of the client threads subscribing to the changed component that a change has occurred. Each such client thread may then notify a client using the appropriate server component object for that client thread. The notify message sent to the client may include the new component data or may simply notify the client that new data exists and that the client must make a manual pull or read of this data via the client thread established for the changed configuration component. Similarly, the runtime thread 222 detects particular changes made to the process control system performed by any runtime service 246 and notifies client threads which are subscribing to components associated with the changed data of the change.

Generally speaking, access to data within the configuration database 203 is performed on a component by component basis. Each component may be a single item within a configuration database such as an area, a controller, a device, a control module, etc. or, if desired, may be a tree of items. Furthermore, it will be understood that any component may be a parent component in that it may have one or more children components associated therewith and/or any component may be a child component of a parent component. Thus an area may be a parent component with a number of children components that indicate particular areas. Each particular area may be a parent component with children components that indicate the controllers, user interfaces, control modules, etc. within a particular area.

Figure 8:
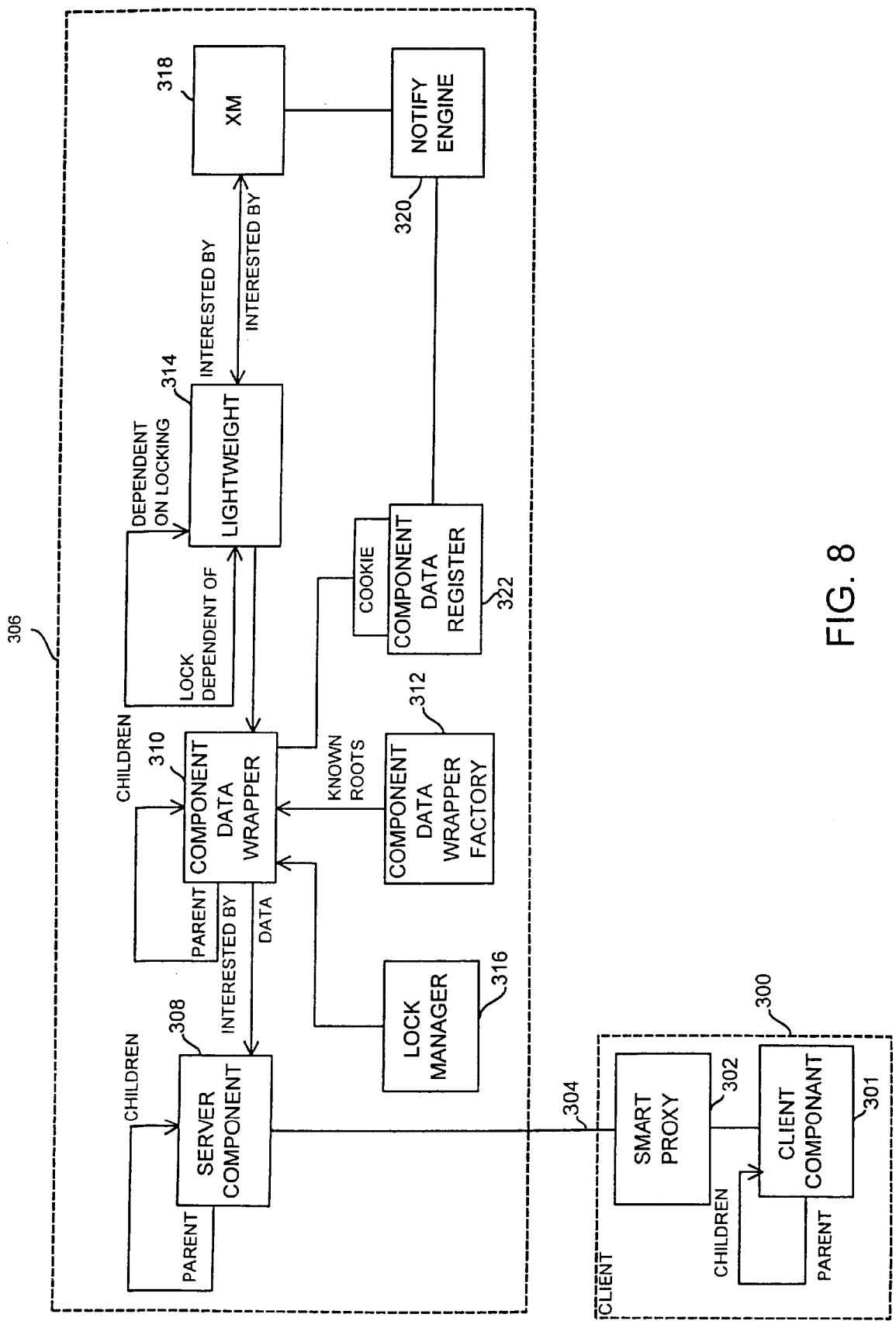
FIG. 8 is an object model used within the client/server system of FIG. 7 to provide multiple clients access to configuration components stored within the configuration database of FIG. 7.

Referring now to FIG. 8, an object map for the objects used to implement the shared cache communication system of FIG. 7 is illustrated. In particular, a client 300, which may be any client, has a client component object 301 which may be, for example, any piece of configuration data which is accessed by or subscribed to by the client for any purpose, such as for display to a user in a configuration hierarchy like that of FIG. 2. The client component 301 may be a parent object having one or more children components associated therewith, as indicated by the feedback path on the client component 301 having a dot on the child side and the absence of a dot on the parent side. In FIG. 8, the use of a dot indicates a one to one or more (i.e., a one to many) relationship while the absence of a dot indicates a one to exactly one relationship. Thus, as illustrated for the client component object 301, each parent client component may have one or more children client components while each child client component can have only one direct parent component.

Each client component 301 is coupled to a smart proxy 302 associated with that client component at the client 300. The smart proxy 302 is responsible for handling communications on behalf of the client component 301 over a communication link 304. In particular, the smart proxy is a distribution object that receives client requests pertaining to a component, calls across the communication link 304 to a server 306 to communicate those requests to the server 306, receives update events, stores cached data and messages sent from the server 306 and passes this data to the client component object 301. Of course, the smart proxy 302 performs the operations needed to communicate over the communication link 304 in any desired manner or using any desired communication technique, such as using the deferred acknowledgment routine described in U.S. Patent Application entitled, "Deferred Acknowledgment Communications and Alarm Management" referred to previously. The communication link 304 may be any desired communication link including, for example, a slow or low bandwidth link, such as a satellite, cellular, Internet or other shared wide area network link, or could be an intermittent link, such as a modem link, or could be a direct link or high speed link, such as a dedicated Ethernet link, if so desired.

The server 306 includes server component objects 308 which are responsible for communicating with the smart proxy 302 of a client over the communication link 304. Each server component 308 is responsible for recording or holding at least a portion of the configuration hierarchy being accessed by or subscribed to by a specific client, for providing an interface to access properties of a configuration component within a configuration database and for receiving update events and forwarding these events to the smart proxy 302 for a client. As illustrated in FIG. 8, a server component 308 may be associated with other server components through a parent-child relationship and this parent-child relationship reflects the parent child relationship established for the associated client components 301. In particular, this relationship reflects the client hierarchy, i.e., the configuration hierarchy being subscribed to by the client. Each server component 308 can be interested in and can be communicatively coupled to exactly one component data wrapper 310 which is an object that is set up within the shared cache portion of the server 306. However, as indicated by FIG. 8, a component data wrapper 310 may be connected to many server components for different clients or client threads.

The component data wrapper 310 is an interface to shared data, i.e., data that is shared within the shared cache 214 of FIG. 7 by multiple clients or client threads. The component data wrappers 310 may record hierarchy relationships (and are a superset of all client hierarchies being viewed by all subscribing clients), may register referencing server components, may notify server components when change events are detected, may record the last modified date (which may be used to accept or reject events from the configuration database) and may effect locking of shared data. Similar to the server component 308, the component data wrapper 310 can be associated with or related to other component data wrappers in a parent-child relationship, with this relationship reflecting the relationship established for all of the server components 308 and all of the client components 301. It will be understood that each component data wrapper 310 can be connected to numerous server components 308 because all client threads accessing a particular configuration component will go through the same component data wrapper 310. The component data wrapper 310, which is created by a component data wrapper factory 312 when a first client first subscribes to an item within the configuration database, generally keeps track of which server components 308 are subscribing to particular components within the configuration database and operates to notify each of the subscribing server components 308 of changes to this data.

Each component data wrapper 310 is connected to or contains one and only one lightweight object 314 which stores a copy of the component data within the configuration database to which one or more server components 308 are subscribing. In other words, a component data wrapper 310 is inserted between one or more server components 308 and a single lightweight 314 to handle access of the lightweight 314 by each of the multiple server components 308. Generally speaking, the lightweight 314 is a repository for data shared between server components 308 and is used to register with the notify thread 220 of FIG. 7 for update notifications pertaining to changes made to the configuration database 203 of FIG. 7.

The component data wrapper factory 312 is responsible for getting/creating component data wrappers 310 and lightweights 314. When a client indicates that it wants to subscribe to a component within the configuration database 203, the component data wrapper factory 312 first checks to determine if a component data wrapper 310 for this component has already been created. If so, the component data wrapper factory 312 connects the client thread to the component data wrapper 310 for this component. If not, the component data wrapper factory 312 creates a new component data wrapper 310 and lightweight 314, which causes the requested information from the configuration database 203 to be loaded into the lightweight 314 and creates or expands the thread for the client using this new component data wrapper 310 and associated lightweight 314. When the component data wrapper factory 312 creates a new wrapper 310, the component data wrapper factory 312 assigns the wrapper 310 a unique immutable identifier. This identifier is passed onto the referencing server components 308 and their corresponding client components 301 which allows a group of or individual components to be uniquely identified which, in turn, avoids many tricky rename problems and provides more efficient marshaling of a list of IDs over a slow communication link, such as when an entire tree or branch of a tree is requested by a client.

A lock manager 316 enables each component data wrapper 310 to control access to its associated lightweight 314 by different clients. The locking of a lightweight 314 may cause the locking of one or more other lightweights, so that, for example, locking of a lightweight that stores parent component data may automatically cause locking of the lightweights which hold children components for that parent component. Similarly, each lightweight 314 may be automatically locked upon the locking of another lightweight, so that a lightweight which holds a child component may be locked when the lightweight that holds the parent component for that child component is locked. In this manner, the lock manager 316 may cause a component data wrapper 310 to lock its associated lightweight 314 when a read from or a write to that lightweight is performed within any particular client thread and locking of this lightweight may automatically cause locking of other lightweights, such as lightweights which hold children components associated with the lightweight being locked.

Still further, each lightweight 314 uses one or more transactional memory objects (XMs) 318 to read or write component properties from or to the configuration database 203 of FIG. 7 using a context memory. An XM 318 is fired up each time a lightweight 314 needs to make a read of or a write to the configuration database 203. The XM 318 provides a pointer into the context memory (which is client thread local) to be used to make this read or write and the XM 318 causes the read into or the write from the configuration database 203 using the context memory. The XM 318 can also be used to create/delete database objects within the database 203 and to un-register notification interest with the configuration database 203. Once the appropriate read or write has been performed for a lightweight 314, the XM 318 is released. However the data stored in the context memory still exists and the pointer to this memory is stored in thread local storage to be used later if needed. The use of XMs is standard in object database managers and, so, will not be described further herein.

A notify engine 320 registers with each XM 318 and detects changes to any of the data values within the data storage locations within the configuration database 203 pointed to by the XMs 318. Such changes may be caused by, for example, a client causing a write to the configuration database 203, a runtime process or some other external process. When the notify engine 320 detects a change to the database items pointed to by any of the XMs 318, the notify engine 320 notifies the component data wrapper 310 that has the lightweight 314 associated with this XM 318 which, in turn, notifies all of the clients subscribing to the component that a change has been made and that new values for the component are available. To perform this operation, the notify engine 320 uses a component data register (also referred to as a wrapper map) 322 which is a map that maps each component data wrapper 310 with a database location pointed to by an XM 318. More particularly, the component data register 322 is a lookup table that relates component data wrappers 310 with notification cookies or IDs created as a result of the operation of the XMs 318 accessing the database 203. Sometimes these IDs are also referred to as the "magic numbers" and, generally speaking, these IDs identify a location or identify of a component stored within the database 203. The notify engine 320 obtains a list of update events related to each of the database locations associated with the magic numbers and uses the component data register 322 to find the component data wrappers 310 associated with each component for which a change has occurred. As a result, the notify engine 320 is an event generator that periodically gets a change list from the configuration database 203 and fires change events to the component data wrappers 310 for which changes have occurred.

Generally speaking, each component data wrapper 310 registers all of the XMs associated with its lightweight with the component data register 322 as client threads are created to thereby obtain change notifications. In return, the data component wrappers 310 receive a unique cookie for each registration and these cookies are stored in the component data register or wrapper map 322. In response to a change notification, a component data wrapper 310 forces its associated lightweight 314 to reload from the database, if required, and to update the configuration hierarchy. Furthermore, the component data wrapper 310 sends update messages back to each of the server components 308 which are related to or which are accessing the component data wrapper 310, and the server components 308 then resynchronize with the shared cache, i.e., the lightweights 314. Finally the server components 308 send an update message to the client components 301, which resynchronize with the server components 308.

Figure 9:
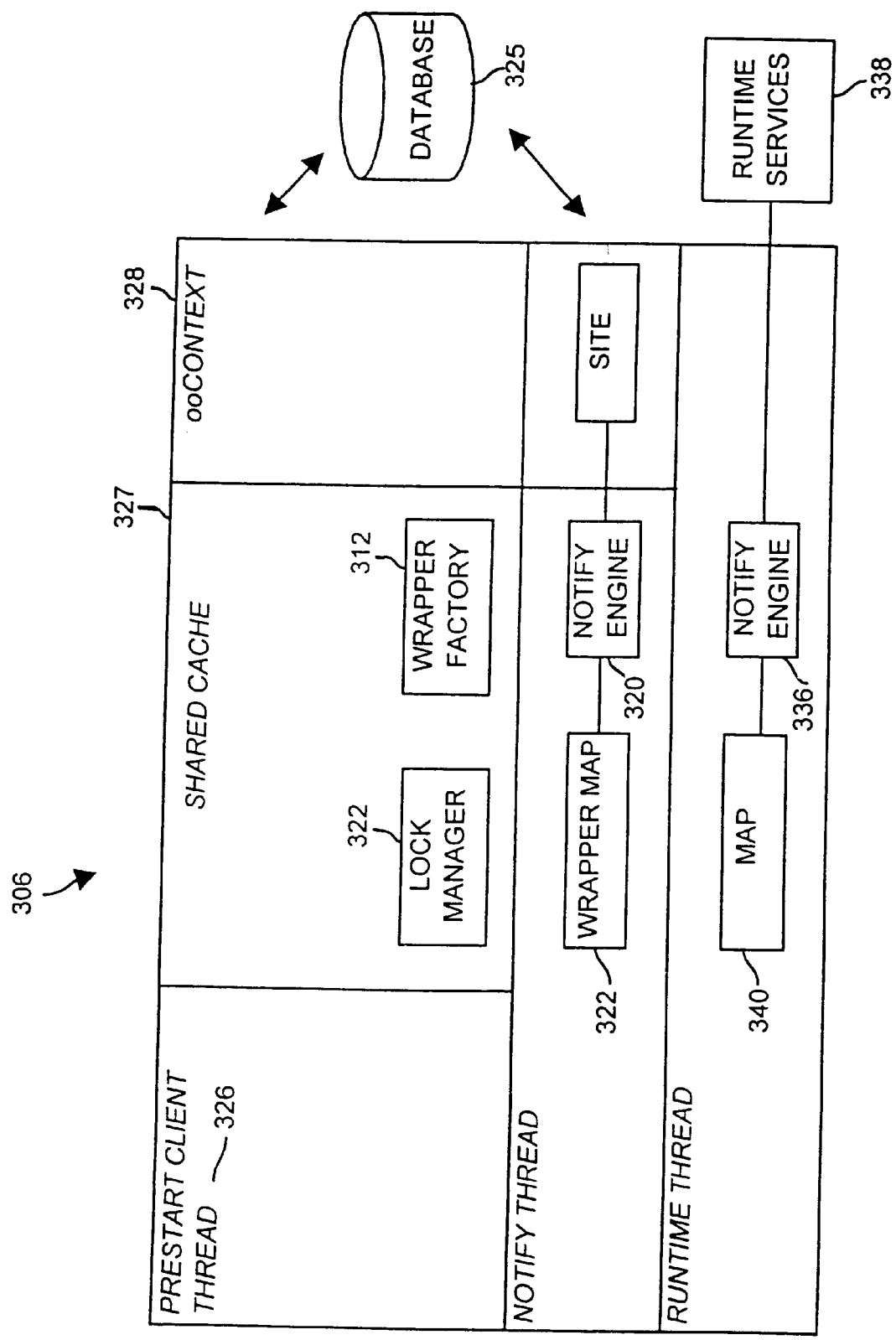
FIG. 9 is a block diagram of the state of the objects within the database server of FIG. 7 at start up.

Referring now to FIG. 9, the state of the database server 306 (which may be the server 202 of FIG. 7 or any of the database servers of FIGS. 1, 3–6) is illustrated at start-up, i.e., before any client has subscribed to any of the data within the configuration database 325 (which may be for example, the database 203 of FIG. 7 or any of the configuration databases of FIGS. 1 and 3–6). The server 306 includes a pre-start client thread 326 having no server component objects therein, a shared cache 327 which has no component data wrappers or lightweights and an empty database context memory portion 328. The shared cache 327 of the server 306 includes a component data wrapper factory 312 and a lock manager 316 which coordinates locking of components being read from the database 325. As illustrated in FIG. 9, a notify thread includes a notify engine 320 which detects changes made to data within the database 325 as describe above, and a component data register or wrapper map 322 which maps data component wrappers within the shared cache 327 with locations within the configuration database 325. Of course, because no data wrappers exist within the shared cache 327, the wrapper map 322 is empty.

Similarly, a runtime thread includes a notify engine 336 that detects changes made to certain parts of the configuration data by runtime services 338 which may be any services, such as auto-sensing services, or other applications run during runtime or configuration activities, and a map 340 which enables the runtime notify engine 336 to send change messages to appropriate component data wrappers within the client threads being run in the server 306. At startup, the runtime notify engine 336 creates an instance of an object that runs sensing to detect specific changes within the configuration of the process control network, such as the addition of a new node or the addition of new devices (like decommissioned controllers) within the system. In one embodiment, the notify engine 336 polls the runtime services 338 (which can be any runtime services or applications) for lists of decommissioned controllers and Fieldbus devices. The map 340 generally points to a memory location or area where appropriate data wrappers (when created) will register to receive information pertaining to the creation of a new node, device, etc. within the process control system. Of course, not all data wrappers need to register with the runtime thread, but only those wrappers associated with components that relate to the newly added devices, such as the decommissioned controllers component illustrated in FIG. 2. At startup, the map 340 points to a memory location at which no wrappers have registered.

Figure 10:
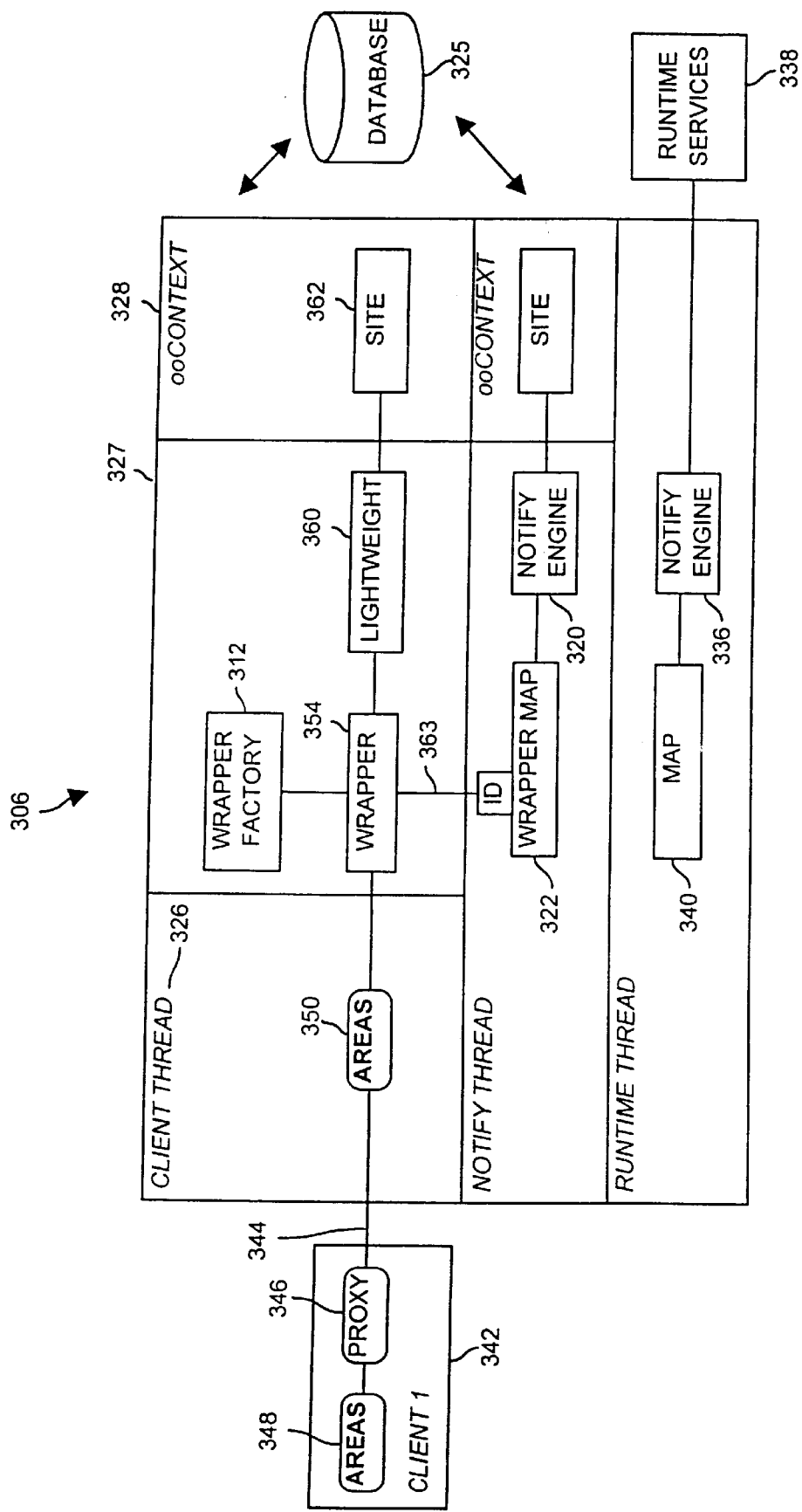
FIG. 10 is a block diagram illustrating the operation of the objects within the database server of FIG. 7 when a first client connects to the server to access a first configuration component from the configuration database.

Referring now to FIG. 10, the operations of the server 306 are illustrated when a first client 342 connects and subscribes to a component within the configuration database 325. In particular, the client application starts up, connects to the server 306 via a communication link 344 using a smart proxy 346 to request a component 348 within the configuration hierarchy. At this time, the server 306 assigns the prestart client thread 326 to the client 342 and creates a new prestart client thread (not shown) to be used by the next client that connects to the server 306. Typically, the client 342 begins by requesting a root object, such as the Areas component. At this point, an Areas server component 350 is created in the server 306 and the Areas server component 350 requests the Areas component from the wrapper factory 312. The wrapper factory 312 recognizes that no component data wrapper (hereinafter "wrapper") has been created for the Areas component within the shared cache 327 and creates such a wrapper 354 (an Areas wrapper), associating the wrapper 354 with the Areas server component 350 within the client thread 326. The wrapper factory 312 creates a lightweight 360 that is uniquely associated with the newly created wrapper 354 and that is tied to the database "site" context 362 for the client thread. The site context is used because the root Areas component was requested and this component is associated with a site object within the database 325. At this time, the lightweight 360 makes a call to the database 325 for the Areas component by creating an XM (not shown). The XM points to a memory location within the context memory 328 to be used by the client thread 326 and causes the database manager to read the Areas component and store the component data in the site context memory 362. Next, this data is loaded into the lightweight 360 and the XM is released.

During this process, the wrapper factory 312 or the XM registers the newly created Areas wrapper 354 with the wrapper map 322 for change notifications when changes occur to its database counterpart, in this case within the Areas component of the database 325. This registration is illustrated by the line 363. To perform this registration, a unique identifier (ID) is created for the wrapper/database site combination and this ID is posted in a registration message sent to the notify thread. Upon processing the registration message, the notify thread adds an entry to the wrapper map 322 for the Areas wrapper 354 keyed by the ID. This entry relates the magic number associated with the XM, which points to an object or location within the database 325, with the wrapper 354.

Next, the Areas component is sent from the wrapper 354 to the server component 350 which is updated with the Areas component data. The server component 350 then sends the Areas component data to the smart proxy 346 of the client 342 where the component data is provided to the client component 348. Thereafter, the notify thread monitors changes to the Areas component within the database 325 and, if changes are made, looks up the ID for the wrapper associated with this component within the database 325 as defined by the wrapper map 322. The notify thread then notifies the wrapper, in this case the wrapper 354, of the change. If necessary, the wrapper 354 will update the lightweight 360 to reflect the change by causing a read of the database 325. Thereafter, the wrapper 354 will instruct the server component 350 of the change and the server component 350 can request the new data for the Areas component, which new data can be read from the lightweight 360. Next, the server component 350 notifies the client 342 of the change and the client 342 can request the new data for the Areas component from the server component 350 so that the change in the Areas component is reflected back to the client component 348 either automatically or by notifying the client of the change and waiting for the client to request the new component data. While the client 342 could perform a manual pull of the new component data from the server component 350, it will be assumed hereinafter, for the sake of discussion, that new data or changed data is automatically sent to a client when a change is detected.

Similarly the runtime notify thread uses the notify engine 336 to detect particular changes made in the configuration of the process control system based on the operation of the runtime services 338. If a particular change has occurred, such as a node or a device has been added, the notify engine 336 looks to the memory location specified for that change by the map 340 to see if any wrappers have registered to receive an indication of the detected change. If so, the notify engine 336 sends an event message to the registered wrapper (s) which can process that message similarly to the way in which event messages generated by the notify engine 320 are processed. It will be understood that a data wrapper which wants to receive notifications of changes detected by the runtime notify thread will register at the memory location specified for that change by the map 340 by, for example, storing the ID of the wrapper to receive the change notification at that memory location when the data wrapper is created.

Figure 11:
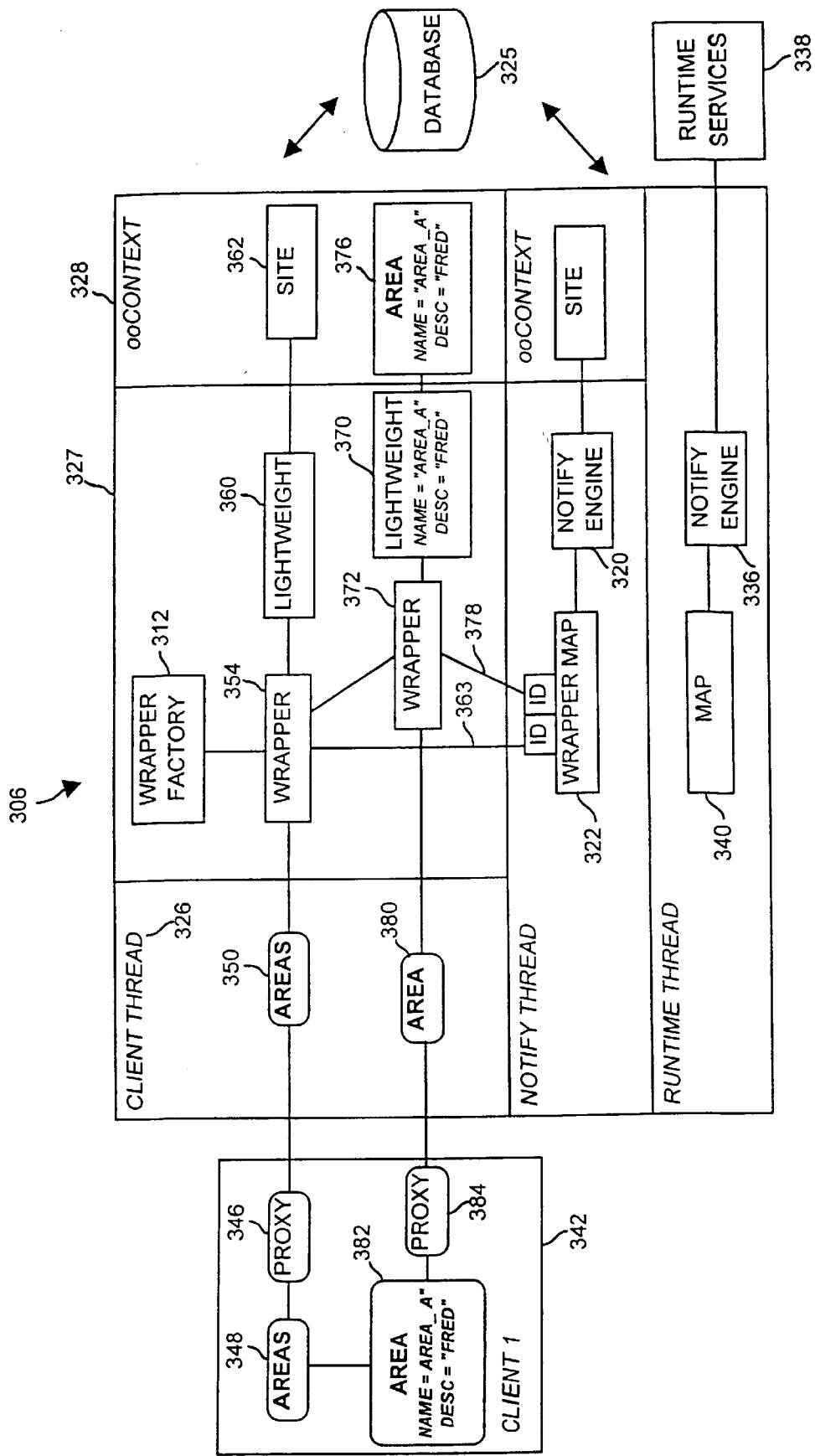
FIG. 11 is a block diagram illustrating the operation of the objects within the database server of FIG. 7 when the first client loads children of a component from the configuration database.

Referring now to FIG. 11, the client 342 may next want to load children for the Areas client component 348. In this case, the client 342 calls a load children command and on the Areas root component and this command is passed through the proxy 346 to the server component 350 and, from there, to the Areas lightweight 360. The Areas lightweight 360 queries the configuration database 325 using the context memory 362 for the client thread 326 to obtain information about the areas children components. This data is returned and a lightweight and associated data wrapper are then created for each child component associated with the Areas component. In FIG. 11, the Areas component is illustrated as including only one child component named Area_A with a description of "Fred" and this new child component data is stored in a new lightweight 370. However, other Area child components could also be associated with the Areas component and, in that case, a new lightweight would be created for each of these children along with the other objects described below.

Upon the creation of the new lightweight 370, the Areas wrapper 354 (or the wrapper factory 312) wraps the new area lightweight 370 within a separate wrapper 372 associated with the Areas wrapper 354 as a child wrapper. The Areas wrapper 354 also returns the new Area component to the server component 350. The new lightweight 370 creates an XM to register with the database 325 via the context memory 376 to obtain specific data pertaining to the Area child component. The wrapper 372 or the lightweight 370 also sends a registration message to the notify thread with the list of new wrapper IDs (in this case, one wrapper ID) and database magic numbers (in this case, one new magic number) associated therewith. The new ID is stored in the wrapper map to indicate the new wrapper 372, as indicated by the line 378. The magic number indicating the location of the new child Area component in the database 325 is also provided to wrapper map 322 and is stored for this ID.

Meanwhile, the Areas server component 350 manufactures a child Area server component 380 for the new child Area component and, in doing so, embeds a pointer within the new child Area server component 380 to the wrapper 372 created for the child server component 380. The server component 350 also sends a list of child components (in this case a list of one) to the client Areas component 348 via the communication link and the proxy 346 and the Areas client component 348 manufactures a child Area client component and embeds a server component reference (to the server component 380) in the child Area client component 382 to enable communication between the new child client component 382 and the new child server component 380. A smart proxy 384 for the client component 382 is then created which completes the process of extending the client thread 326 to include a subscription for a new child component within the database 325. Of course, the same procedures would take place for other children components of a particular component and the client thread 326 can be extended to subscribe to more than one child component if more than one child exists. Likewise, the client thread 326 can be further extended by obtaining child components associated with newly subscribed child component 382 or by requesting another root component.

Figure 12:
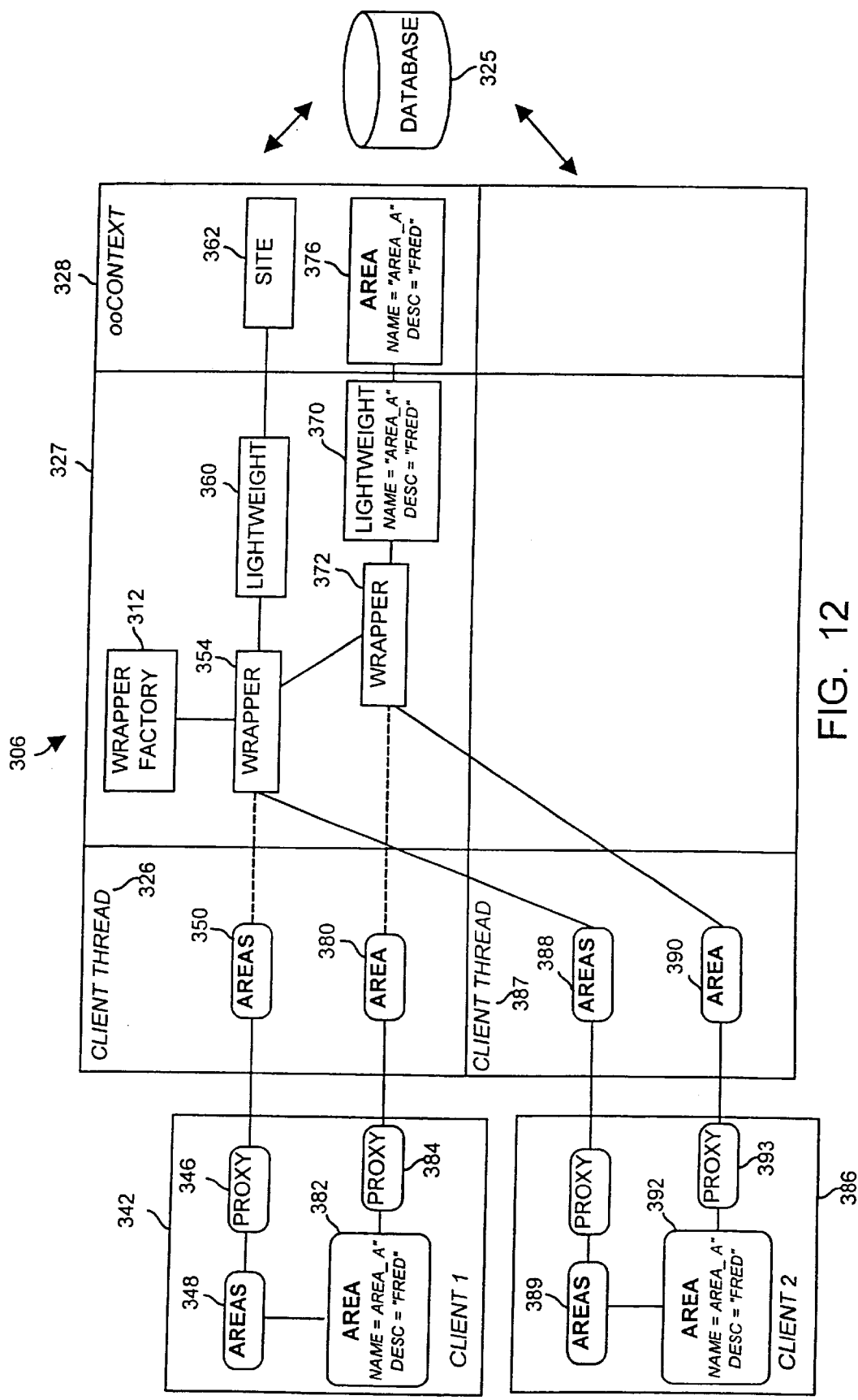
FIG. 12 is a block diagram illustrating the operation of the objects within the database server of FIG. 7 when a second client connects to the database server to access first and second configuration components from the configuration database which are already stored in the shared cache of the database server.

Referring now to FIG. 12, the process in which a second client 386 subscribes to the same components that were subscribed to by the first client 342 is described in detail. Here, the notify threads of the server 306 are not shown for the sake of clarity. In particular, the second client 386 connects to the server 306 in a similar manner as the first client and subscribes to the Areas component. Upon connecting to the server 306, the second client 386 is assigned to a second prestart thread 387. In this example, the client 386 asks for the Areas root component which creates an Areas server component 388 in the second client thread. The server component 388 asks the wrapper factory 312 for a wrapper for the Areas root component and, because the wrapper 354 already exists within the shared cache 327 for the Areas root component, the wrapper factory 312 returns a pointer to the wrapper 354. At this point, the Areas server component 388 queries the wrapper 354 for the Areas root component data which is read from the lightweight 360 that has already been established for the first client 342. The Areas root component data stored in the lightweight 360 is returned to the Areas root server component 388 and, from there, to the client Areas component 389.

Upon a request by the second client 386 for the children of the Areas root component 389, the Areas root server component 388 asks the wrapper factory 312 for the children wrappers and, because these wrappers (in this case, one wrapper) already exist, the pointer to the wrapper 372 is provided by the wrapper factory 312 to the Areas root server component 388. The server component 388 then creates an child Area server component 390 having a pointer to the wrapper 372. The Areas root server component 388 sends the child information to the second client 386 which creates the appropriate client component 392 and smart proxy 393 which communicates with the server component 390. The child Area server component 390 also reads the lightweight 370 via the wrapper 372 and sends this data to the client component 392 via the proxy 393. Because no calls to the database 325 were made in this process, the second client's database context is empty, as all information came through the lightweights 360 and 370 which used the database context of the first client thread 326 to obtain that data. However, if the second client 386 requests data for which no lightweight has been created, the wrapper factory 312 would create a wrapper and lightweight for that component and connect to the database 325 through the database context for the second client thread 387 to obtain that data from the database 325.

It will be understood that any other client which now subscribes to the Area root or the child Area components will be able to access this data from the shared cache 327 without making any calls to the database 325, which reduces the load on the database 325. Likewise, upon receiving an event notification from a notify thread, the data wrapper 354 will notify the server component 388 for the second client 386 as well as the server component 350 for the first client 342 to notify both of the clients of the change.

Figure 13:
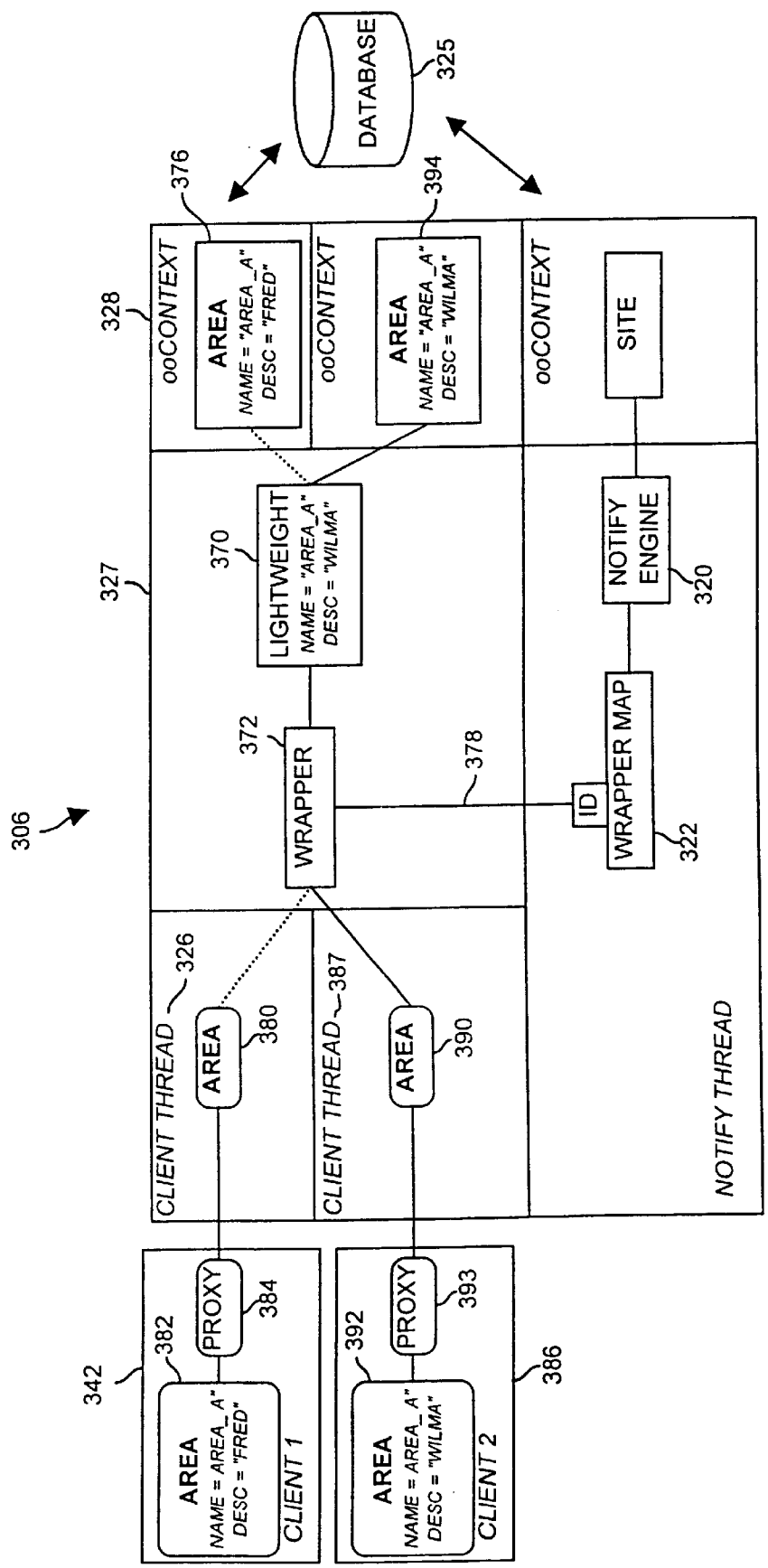
FIG. 13 is a block diagram illustrating the operation of the objects within the database server of FIG. 7 in response to an event notification generated by a database server notify thread.

Referring now to FIG. 13, the activities associated with the notify thread in detecting a change in a configuration data item and the manner in which this change notification is automatically returned to each subscribing client is described. In this case, the second client 386 changes the name of Area_A from "Fred" to "Wilma" and posts a write or a promote message with this change to the server 306. The server component 390 loads the new name and provides this name to the wrapper 372 which loads the new name in the lightweight 370. The lightweight 370 automatically loads the new name into the database context 394 for the second client 386. From here, the new name is stored in the database 325. However, nothing has happened to the first client's version of the Area_A component. In the past, the first client 342 would have had to periodically poll the database 325 for changes, resulting in a lot of reads from the database 325 and a lot of downloads over the slow communication link.

In this case, however, the notify engine 320 periodically polls the database 325 for a list of update events for each of the database items associated with the magic numbers in the wrapper map 322. Each event includes information indicating which object changed and some information about the change, such as the type of change (rename, deletion, property change, child addition/deletion, etc.) and maybe some hints, such as the new and old name in the case of a rename operation. The notify engine 320 uses the wrapper map 322 to match the magic number of the changed object with a wrapper ID and asks the associated wrapper (in this case, the wrapper 372) to process the update event. This processing may include reloading the lightweight 370 from the database 325 to get the new value or changed value of this object. Such a reload may be necessary when the lightweight 370 was not involved in making the change to the database 325. The wrapper 372 may refuse to reload the lightweight 370 if, for example, a detected change is an old or out of date change, or for any other desired reason. The wrapper 372 also notifies each of the server components 380 and 390 of the change which, in turn, send messages, such as a windows message, to each of the clients 342 and 386 (which subscribe to this component) to indicate the change. When processing an event message from the wrapper 372, the server components 380 and 390 forward the event and any new data to the smart proxies of the respective clients 342 and 386. The proxy 384 of the first client 342 posts a refresh message to the client component 382 which may cause a refresh on a user interface at the first client 342. In this case, when the user interface refreshes, the proxy 384 gives up the new data to the client component 382 and the update is complete. The second client 386 may ignore the message because the second client 386 already has the change.

With this subscription system, the first client 342 did not have to make any database calls and only one call was made (over for example, a slow communication link) from the server 306 to the first client 342 to precipitate a complete refresh of the changed item at the first client 342. Of course, this process occurs for every lightweight and for every client subscribing to any lightweight so that any change to the database 325 can be automatically sent back to each client subscribing to that item with minimal database reads and minimal communications over the slow communication link.

Figure 14:
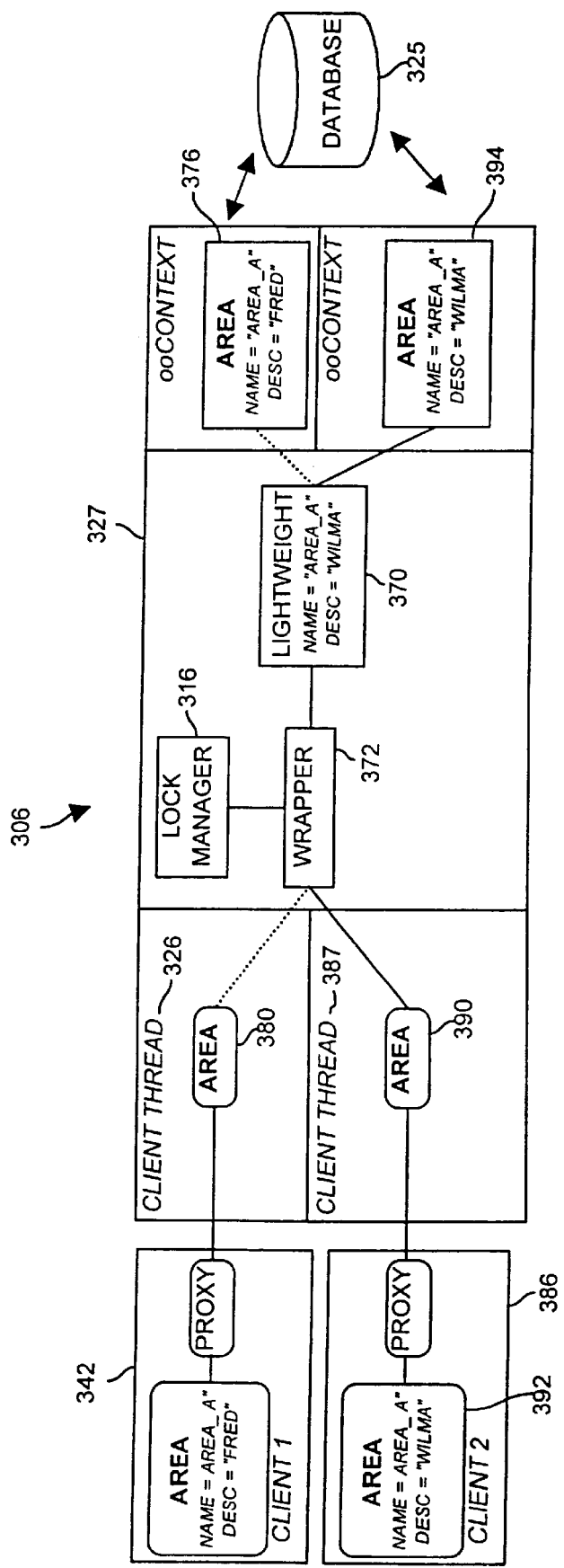
FIG. 14 is a block diagram illustrating the operation of a lock manager within the database server of FIG. 7 which arbitrates concurrent access to the shared cache within the database server.

Referring now to FIG. 14, the operation of the lock manager 316 in arbitrating concurrent access to the cache 327 will be described in more detail. As will be understood by the foregoing description, each of the lightweights in the shared cache 327 can be shared by one or more client threads. As a result, many clients can be reading the same lightweight at the same time. No locking is typically required for these reads. However, it is possible to run into a situation in which two clients are simultaneously trying to write to a lightweight and thus, to the database 325, which may cause problems such as deadlock.

To prevent these problems, the lock manager 316 manages access to each of the lightweights by handing out locks and maintaining a lock table. Generally speaking, the lock manager 316 operates by granting lock requests on wrappers. When a client thread wants to access a lightweight, the thread must first acquire a read or a write lock on the wrapper. If the lock is unavailable because, for example, another client thread is in the process of accessing that lightweight, the lock manager 316 will hold the requesting thread at bay until the lock becomes free.

In the example of FIG. 14, the first and second clients 342 and 386 attempt to write to the description of Area_A. Here the second client 386 attempts to perform a write to the lightweight 370 and, in this process, requests and is granted a lock on the wrapper 372 from the lock manager 316. If the first client 342 then tries to read from or write to the properties of the lightweight 370, the lock manager 316 holds the execution of the first client thread 326 when this thread attempts to acquire a read lock or a write lock on the data wrapper 372. In the meantime, the second client thread 387 writes to the lightweight 370 through its own database context 394 to change the name of the Area_A to "Wilma". When this write operation is complete, the lock manager 316 allows the first client thread 326 to proceed to read from or write to the lightweight 370 and, thereby, to the database 325. It should be noted that a write lock can be denied or held at bay until a read lock is released. However, there is usually no reason to hold a read request at bay if only a read lock has been granted to another client thread. Still further, it should be noted that the lock manager 316 can be used to establish reserve operations described above. In particular, a reserve lock may be requested by and granted to a client on, for example, the lightweight 370. After that time, any client may read the lightweight 370 but not write to the lightweight. If a reserve lock has been granted, the lock manager 316 may cause the wrapper 372 to send a message to the client requesting a write lock that no writes are allowed on this data as it has been reserved by a different client. Of course, the lock manager 316 may also provide or store an identification of the client that was granted the reserve lock and enable this client to write to the lightweight 370 during a promote operation.

Anywhere there is locking, there is the potential for deadlock. For example, a first client could take out a lock on component A and, at the same time, a second client could take out a lock on component B. Next, the first client could attempt to take out a lock on component B and be stalled until the lock on component B is released by the second client. However, if the second client attempts to take out a lock on component A before releasing the lock-on component B, the locks on both component A and component B will never be released, resulting in deadlock. To avoid deadlock in the shared cache 327, the lock manager 316 may be under a restriction that any particular client must take out a lock and release it sequentially, i.e., before taking out another lock. However, in this case, two clients may overwrite changes made by the other with the result that the last write wins. For example, the first client modifies component A, and the second client modifies component B. The first client then modifies component B, and the second client modifies component A. While deadlock has been avoided, component A has the second client's changes, and component B has the first client's changes.

Although the lightweights do not have a hierarchy, some inter-lightweight references may exist. If so, this fact is a potential source of deadlock, if, for example, an update operation requires both lightweights to be locked at the same time. To avoid this problem the lock manager 316 can implement a locking order on related lightweights. If, for example, a first lightweight is associated with a second lightweight, the first lightweight is added to the second lightweight's locking list. If a client wants to lock the second lightweight, the client must lock the first lightweight first. The lock manager 316 may keep a list of this order and enforce the order in the locking procedures. To enforce this dependent locking, the lock manager 316 may only allow one lock per client at a time, unless the objects involved form a dependency tree.

Where modifying a series of components in the database 325 happens in one database transaction, it is possible for the transaction to fail and, thus, rollback to the state of the database before the changes were made in the database 325, which results in the cached components (i.e., the lightweights) being inconsistent with the components as stored in the database 325. To provide a rollback mechanism, a client thread may keep a list of modified components to which it adds the components while the database modify transaction is active. If the multi-step database transaction is aborted or the commit fails, the list is traversed and each component is reloaded, which means reloading a component's properties and checking for new/deleted children. If such a list of modified components is kept in a known order (e.g. ordered by wrapper ID), it is possible to produce a lock table and to take out multiple locks per client operation.

To reduce the amount of time that a lightweight is locked, a lightweight, when writing properties back to the database 325, may first clone the component data object stored in the lightweight. The clone is supplied with the new property values and is used to save the values to the database 325. Once this operation is complete, the original component data object is mutated into or is replaced in favor of the clone. Using such a cloning technique reduces the time the cache 327 or the lightweight is locked because the lightweight can be unlocked after the clone is made, which improves concurrency of access to the cache. However, in this situation, a race condition may exist where two clients are trying to write to the same lightweight at the same time. In particular, the cache becomes inconsistent with the database if the first client saves its version of the component to the database 325 before the second client but mutates the cache (i.e. the lightweight) after the second client. Here, the database has the second client's changes but the lightweight has the first client's changes. This situation can be avoided either by coordinated locking or by allowing only one clone for any lightweight at any time. All of these procedures can be arbitrated by the lock manager 316.

As indicated above, new children lightweights come into existence either by loading these children from the database 325 in response to a client request or when a client adds a new child. If desired, clients can be allowed to manipulate the cache 327 to the point of creating/loading new child component data objects before locking the parent so that the parent lightweight needs to be locked only when a child is actually connected to the hierarchy or associated with the parent. In other words, all of the objects associated with children components being created may be created in non-shared manner or in a local memory until all the children are completed. Then, the parent may be locked and modified to include pointers to these children to thereby migrate these children objects to the shared memory. As a result, the parent lightweight is only locked when it is being altered to be associated with the new children components, and not during the creation of the children objects.

Figure 15:
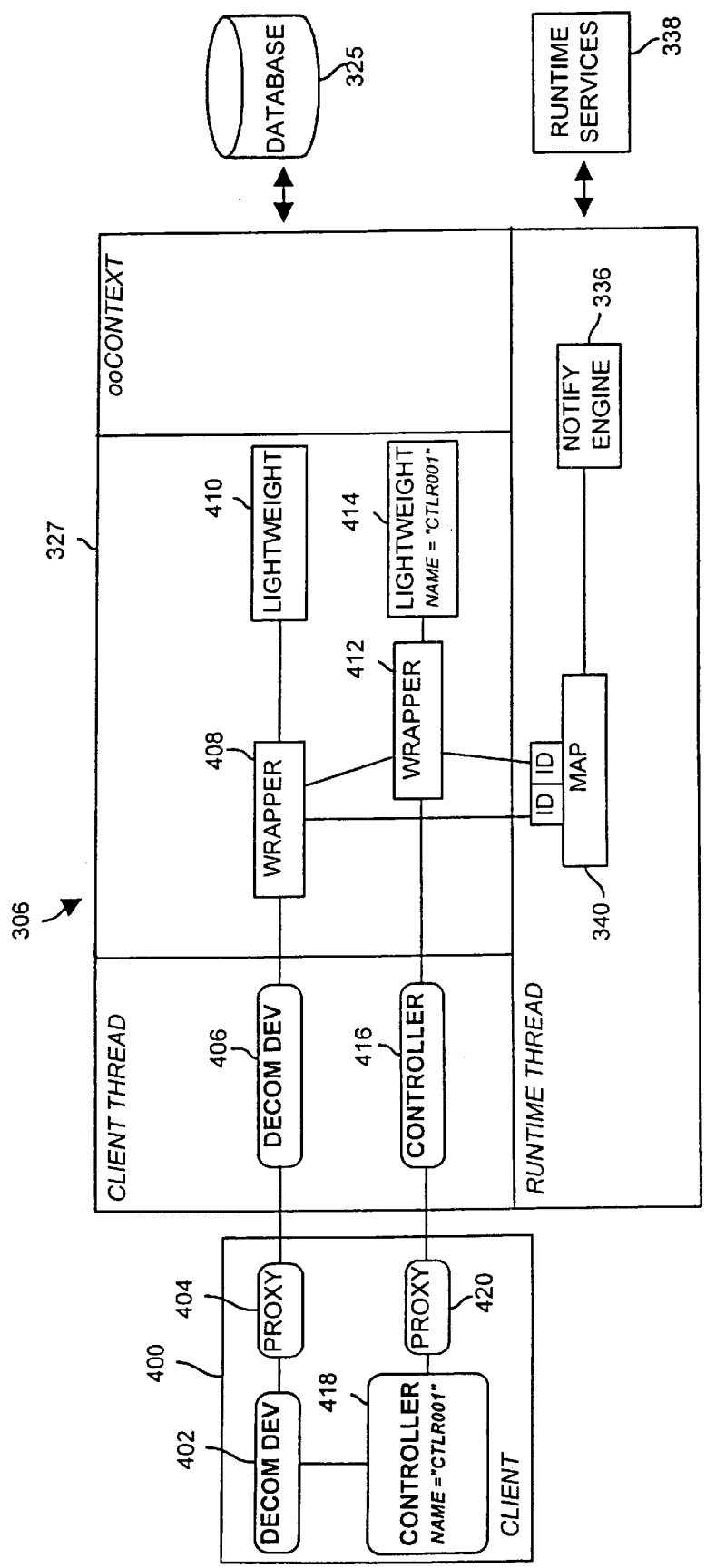
FIG. 15 is a block diagram illustrating the operation of the objects within the database server of FIG. 7 in response to an event notification generated by a runtime services notify thread.

Referring now to FIG. 15, the operation of the runtime notify thread which operates to notify clients of changes to the configuration of a process control system caused by runtime operations is illustrated. In this case, it is assumed that a client 400 is subscribing to a decommissioned device component and that the client component 402, the proxy 404, the decommissioned devices server component 406, the wrapper 408 and the lightweight 410 are already set up within the client 400 and the server 306. It is also assumed that the wrapper 408 registered with the map 340 to receive indications of the addition of new controllers to the system when the wrapper 408 was created. In this example, the notify engine 336 of the runtime notify thread detects the addition of the new controller (named "CTLR001") added via runtime services (such as an auto-sensing application) and sends an update event to the decommissioned devices wrapper 408 indicating the presence of this new controller. The decommissioned devices wrapper 408 responds to the update event by creating a child wrapper 412 for the detected controller, creating a lightweight 414 for the new controller and, if possible, storing the controller data as delivered by the runtime services into the lightweight 414. The lightweight 414 may also store this data in the database 325 if desired and register the ID for the data wrapper 412 and the magic number of the database location where the new controller information is stored with the wrapper map 322 for the notify thread. The wrapper 412 may also register for updates with the map 340. Upon loading the new controller as a new child in the shared cache 327, an event is posted to the decommissioned devices server component 406 which responds by creating a new child controller server component 416 embedding a pointer to the new child data wrapper 412 and pushing the new controller data to the client 400. The client proxy 404 receives the new child event, stores the new child information and posts a refresh message to the user interface at the client 400. When the decommissioned devices client component 402 loads new children, the decommissioned devices client component 402 constructs a new child controller component 418 and establishes a connection back to the server component 416 for the controller component 418 using server component identification information sent to the client 400 by the decommissioned devices server component 406. A proxy 420 for the controller client component 418 is created and assumes communication with the server component 416 on behalf of the controller client component 418. Thus, the addition of the controller is detected by the notify engine 336 and that change is sent to the associated data wrapper 408 which may change the data stored in a lightweight or which may cause the creation or deletion of a lightweight and associated wrapper. The creation of a new wrapper and lightweight results in the expansion of each client thread subscribing to the parent object.

Besides the operations described above, other activities or operations may be implemented by the server 306. For example, a client may perform a create operation in which the client creates a component to be stored in the database 325. The operations associated with this create activity are very similar to loading of a child, with the extra step of creating the underlying database object in the database 325, instead of loading this object from the database 325. Here, the client will create a component and send this component to the server component associated with the parent of the created component. This action will cause the wrapper factory 312 to create a wrapper and a lightweight as a child of the associated parent wrapper and lightweight, and the new lightweight will be loaded with the new component. The lightweight will then write the new component to the database 325, as well as registering the database location and wrapper with the wrapper map 322 in the notify thread. A new server component is then created for the wrapper and assumes communication with the client for this new component.

To delete a component from the database 325, a client first deletes and then releases the associated server component.

The deletion of the server component puts the associated data wrapper and the lightweight into a deleted state, which then deletes the component from the database 325. The wrapper sends a deletion message to each of the other referencing server components (i.e., within other client threads) which, in turn, notify the subscribing clients of the deletion activity. When in the delete state, the wrapper is removed from the configuration hierarchy and cannot perform any further database operations. However, the wrapper may remain until all referencing server components have released it. Of course, the referencing server components will not release until the associated clients have released which occurs after the server components have notified the clients of the deletion activity. Of course, the database event mechanism may eventually produce a delete message that will get funneled back to the wrapper by the notify engine of the notify thread. Because the wrapper is in a deleted state, it ignores this message.

Mutation of a configuration component may occur because some operations on a component cause the type of that component to be changed. This mutation requires that the component and sub-tree be reloaded from the database 325. To effect this operation, the entire lightweight parent/child hierarchy for the mutated component is reloaded from the database 325 into the existing lightweights. Thereafter, the server components are re-established and the new values within these server components are then synchronized with the client components. Such a synchronization involves iterating through the children components and removing those whose type has changed and those that no longer exist. New children are loaded and added as required.

Of course, a client may simply release or un-subscribe with a component within the database 325. In this case, the client releases the associated server component, which causes the associated wrapper to decrement a wrapper reference count. When the wrapper reference count for a wrapper goes to zero, no server components are referencing this wrapper and thus, no clients are subscribing to this wrapper. In this case, the wrapper unloads. If desired, the wrapper may wait for a timeout period before unloading in case the wrapper needs to be reload immediately. When unloading, the wrapper destroys its associated lightweight, de-registers the update notification in the database 325 and de-registers from the wrapper map. Furthermore, when a component is released, it releases its lightweight and all the children lightweights/wrappers, nulling the back pointers of the children lightweight/wrappers.

While the operation of the server 306 has been described herein for two clients accessing one or two components, it will be understood that the same technique can be extended and used for any number of clients and client threads reading from and writing to any number of configuration objects within a database. Furthermore, while the technique for using a shared cache to establish subscriber relationships for multiple clients has been described herein for use in accessing configuration data within a process control system, it will be understood that this technique may be used in any other database access system, including those which are not related to configuration databases and those which are not related to process control system databases.

Also, while the database access technique described herein assumes that clients communicate with a server on a per component basis, configuration tree marshaling may be used to provide more optimal communications between a client and a server. In particular, when a client knows it must retrieve a whole tree or sub-tree, it is more efficient to make one server call to obtain the whole tree, rather than recur-sively calling a load children routine at each level of the tree. The converse is also true so that, when the client wants to write a whole tree back to the server, the whole tree may be sent in a signal message. Of course, these messages may be intercepted by the client and server and the objects necessary to establish subscription relationships (as described above) may be created at once to thereby create all of the objects within the client or the server necessary for the client to subscribe to the entire tree or sub-tree or to write an entire tree or sub-tree.

Still further, it will be understood that the objects and other elements and steps described herein to be created in or performed by the server and the clients may be implemented using any desired programming technique or language and that these programs may be stored in memories and executed on processors in any manner within the clients, the servers and the databases described herein. Moreover, although the data access technique described herein is preferably implemented in software, it may be implemented in hardware, firmware, etc., and may be implemented by any processor associated with the process control system 10. Thus, this technique may be implemented in a standard multi-purpose CPU or on specifically designed hardware or firmware as desired. When implemented in software, the software routines may be stored in any computer readable memory such as on a magnetic disk, a laser disk, an optical disk, or other storage medium, in a RAM or ROM of a computer or processor, etc. Likewise, this software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A configuration database system for use in storing configuration data pertaining to a process control system having a plurality of geographically distributed physical locations, the configuration database system comprising:

a configuration database located at each of the plurality of physical locations, wherein each of the configuration databases is adapted to originally store a different portion of the configuration data;

a communication network that communicatively couples the plurality of geographically distributed physical locations together; and a configuration application adapted to communicate with each of the databases via the communication network and to use data within the originally stored different portions of the configuration data from two or more of the configuration databases to perform a configuration activity with respect to the process control system.

2. The configuration database system of claim 1, wherein the configuration application includes a browser adapted to browse a first one of the configuration databases and to browse a second one of the configuration databases.

3. The configuration database system of claim 1, wherein one of the configuration databases stores a local copy of an item stored originally within a different one of the configuration databases.

4. The configuration database system of claim 1, wherein the communication network includes a slow communication link between two of the configuration databases.

5. A configuration database system for use in storing configuration data pertaining to a process control system having a plurality of geographically distributed physical locations, the configuration database system comprising:
- a configuration database located at each of the plurality of physical locations, wherein each of the configuration databases is adapted to originally store a different portion of the configuration data;
- a communication network that communicatively couples the plurality of geographically distributed physical locations together; and
- a configuration application adapted to communicate with each of the databases via the communication network and to use data from two or more of the configuration databases to perform a configuration activity,
- wherein the configuration application is adapted to subscribe to a subset of the configuration data within a first one of the configuration databases and the first one of the configuration databases includes a database server having a first routine that automatically recognizes a change to the subset of the configuration data stored in the first configuration database to which the configuration application subscribes and a second routine that automatically notifies the configuration application of the change to the subset of the configuration data.

6. The configuration database system of claim 5, wherein the second routine automatically communicates the change made to the subset of the configuration data stored in the first configuration database to the configuration application when the first routine detects the change to the subset of the configuration data.

7. The configuration database system of claim 5, wherein the configuration application includes a locking portion that sends a lock command to lock an item of configuration data within the first configuration database and wherein the database server further includes a locking routine that locks the item of configuration data within the first configuration database to prevent the item of configuration data from being changed by any configuration application other than the configuration application that sent the locking command.

8. The configuration database system of claim 5, further including a second configuration application and wherein the database server includes a second routine that provides concurrent access to a particular item of configuration data within the first configuration database to the first and second configuration applications and wherein the database server further includes a locking routine that locks the particular item of configuration data within the first configuration database when the first configuration application writes to the particular item of configuration data to thereby prevent the second configuration application from the changing the particular item of configuration data when the first configuration application is writing to the particular item of configuration data.

9. A configuration database system for use in storing configuration data pertaining to a process control system having a plurality of geographically distributed physical locations, the configuration database system comprising:
- a configuration database located at each of the plurality of physical locations, wherein each of the configuration databases is adapted to originally store a different portion of the configuration data;
- a communication network that communicatively couples the plurality of geographically distributed physical locations together; and
- a configuration application adapted to communicate with each of the databases via the communication network and to use data from two or more of the configuration databases to perform a configuration activity,
- wherein the configuration databases are established in a hierarchy having at least two configuration databases in a lower level and at least one configuration database in an upper level, and wherein the each of the configuration databases in the lower level are communicatively coupled to the configuration database within the upper level.

10. The configuration database system of claim 9, wherein the lower level includes zones pertaining to different ones of the physical locations and wherein configuration data that pertains to a first zone is stored in the configuration database at the first zone and the configuration data that pertains to first and second zones is stored in the configuration database at the upper level in the hierarchy communicatively coupled to the first and second zones.

11. The configuration database system of claim 9, further including software that detects the use of the same name in the one of the configuration databases within the lower level and the configuration database in the upper level.

12. A distributed configuration database system adapted to be used in a process control system having multiple physical locations:
- a first configuration database located at a first one of the physical locations that stores a first portion of configuration data for the process control system;
- a second configuration database located at a second one of the physical locations that stores a second portion of the configuration data for the process control system, wherein the first portion of the configuration data is different than the second portion of the configuration data; and
- a communication network that interconnects the first physical location and the second physical location using a slow communication link;
- wherein the first and the second configuration databases are adapted to communicate with users at the first and the second physical locations to enable the users to perform one or more configuration activities with respect to the process control system using the first and second Portions of the configuration data.

13. A distributed configuration database system adapted to be used in a process control system having multiple physical locations:
- a first configuration database located at a first one of the physical locations that stores a first portion of configuration data for the process control system;
- a second configuration database located at a second one of the physical locations that stores a second portion of the configuration data for the process control system, wherein the first portion of the configuration data is different than the second portion of the configuration data; and
- a communication network that interconnects the first physical location and the second physical location using a slow communication link;
- wherein the first and the second configuration databases are adapted to communicate with users at the first and the second physical locations; and wherein the second configuration database is adapted to subscribe to configuration data within the first configuration database and wherein the first configuration database includes a database server having a first routine that automatically detects a change to the configuration data stored in the first configuration database to which the second configuration database subscribes and a second routine that automatically notifies the second configuration database of the change to the configuration data stored in the first configuration database to which the second configuration database subscribes.

14. The distributed configuration database system of claim 13, wherein the second routine automatically communicates the change made to the configuration data stored in the first configuration database to the second configuration database when the first routine detects the change to the configuration data stored in the first configuration database to which the second configuration database subscribes.

15. A distributed configuration database system adapted to be used in a process control system having multiple physical locations:
  a first configuration database located at a first one of the physical locations that stores a first portion of configuration data for the process control system;
  a second configuration database located at a second one of the physical locations that stores a second portion of the configuration data for the process control system, wherein the first portion of the configuration data is different than the second portion of the configuration data; and
  a communication network that interconnects the first physical location and the second physical location using a slow communication link;
  wherein the first and the second configuration databases are adapted to communicate with users at the first and the second physical locations; and
  further including first and second configuration applications and a database server associated with the first configuration database, wherein the database server includes a shared cache that provides concurrent access to any particular item of configuration data within the first configuration database to the first and second configuration applications and includes a locking routine that locks the particular item of configuration data within the first configuration database when the first configuration application writes to the particular item of configuration data to thereby prevent the second configuration application from changing the particular item of configuration data when the first configuration application is writing to the particular item of configuration data.

16. A distributed configuration database system adapted to be used in a process control system having multiple physical locations:
  a first configuration database located at a first one of the physical locations that stores a first portion of configuration data for the process control system;
  a second configuration database located at a second one of the physical locations that stores a second portion of the configuration data for the process control system, wherein the first portion of the configuration data is different than the second portion of the configuration data; and
  a communication network that interconnects the first physical location and the second physical location using a slow communication link;
  wherein the first and the second configuration databases are adapted to communicate with users at the first and the second physical locations; and
  further including a third configuration database located at a third physical location and wherein the first, second and third configuration databases are established in a hierarchy in which the first and the second configuration databases are in a lower level and the third configuration database is in an upper level, and wherein the each of first and second configuration databases in the lower level are communicatively coupled to the third configuration database within the upper level via the communication network.

17. The distributed configuration database system of claim 16, wherein the lower level includes first and second zones and wherein configuration data that pertains to a first zone is stored in the first configuration database, configuration data that pertains to the second zone is stored in the second configuration database and configuration data that pertains to both the first and second zones is stored in the third configuration database.

18. The distributed configuration database system of claim 16, further including a routine that detects the use of the same name within the first and the third configuration databases or within the second and third configuration databases.

19. A method of storing and using configuration data related to a process control system when the process control system has two or more physical locations which are geographically separated, the method comprising the steps of:
  storing a different portion of the configuration data within each of a plurality of configuration databases, wherein two of the configuration databases are located at different physical locations;
  providing a communication link between each of the configuration databases, and
  accessing the different portions of the configuration data from two or more of the configuration databases at the same time to perform a configuration activity with respect to the process control system.

20. A method of storing and using configuration data related to a process control system when the process control system has two or more physical locations which are geographically separated, the method comprising the steps of:
  storing a different portion of the configuration data within each of a plurality of configuration databases, wherein two of the configuration databases are located at different physical locations;
  providing a communication link between each of the configuration databases, and
  accessing different configuration data from two or more of the configuration databases at the same time to perform a configuration activity,
  wherein the step of accessing different configuration data includes the step of using an application to subscribe to the accessed configuration data from the two or more of the configuration databases and automatically sending any changes made to the accessed configuration data from the two or more configuration databases to the application.

21. A method of storing and using configuration data related to a process control system when the process control system has two or more physical locations which are geographically separated, the method comprising the steps of:
  storing a different portion of the configuration data within each of a plurality of configuration databases, wherein two of the configuration databases are located at different physical locations;

providing a communication link between each of the configuration databases, and accessing different configuration data from two or more of the configuration databases at the same time to perform a configuration activity, and further including the step of establishing a hierarchy among the configuration databases, wherein the hierarchy includes two configuration databases within a lower level and one configuration database within an upper level, and establishing communications between each of the two configuration databases within the lower level and the one configuration database within the upper level.

22. The method of storing and using configuration data of claim 21, further including the step of using unique names for configuration data within the one configuration database within the upper level of the hierarchy and either of the configuration databases within the lower level of the hierarchy, wherein the same name can be used in the two configuration databases at the lower level of the hierarchy.

23. A process control system comprising:

a database located at a first physical location, wherein the database stores database components;

a multiplicity of client applications, wherein one of the client applications is located at a second physical location substantially geographically separated from the first physical location;

a communication link between the first physical location and the second physical location; and a database server the provides access to the database components within the database by the multiplicity of client applications, the database server including:

a shared cache having a plurality of memory objects, wherein each of the memory objects communicates with the database and stores a copy of one of the database components being accessed by at least one of the multiplicity of clients; and one or more communication objects associated with each of the client applications, wherein each of the communication objects communicates with an associated one of the client applications and with one of the memory objects, wherein a memory object that is being accessed by two or more client applications is communicatively coupled to two or more communication objects.

24. The process control system of claim 23, wherein the database server further includes a notify routine that detects changes to one of the database components and that automatically notifies each of the clients accessing the one of the database components of the existence of the change to the one of the database components.

25. The process control system of claim 24, wherein the notify routine notifies each of the clients accessing the one of the database components of the state of the one of the database components after the change.

26. The process control system of claim 24, wherein the database is a configuration database and wherein the database components are configuration components.

27. The process control system of claim 24, wherein each of the communication objects is adapted to read from and to write to the associated one of the memory objects.

28. The process control system of claim 24, wherein the database server further includes a lock manager which prevents a first one of the communication components from accessing one of the memory objects when a second one of the communication components is accessing the one of the memory objects.

29. The process control system of claim 23, wherein the communication link is a satellite communication link.

30. The process control system of claim 23, wherein the communication link is a cellular communication link.

31. The process control system of claim 23, wherein the communication link is a telephone line communication link.

32. The process control system of claim 23, wherein the communication link is a wireless communication link.

33. The process control system of claim 23, wherein the communication link is a wide area network link.

* * * * *

UNITED STATES PATENT AND TRADEMARK OFFICE
CERTIFICATE OF CORRECTION

PATENT NO. : 6,687,698 B1
DATED : February 3, 2004
INVENTOR(S) : Mark J. Nixon et al.

It is certified that error appears in the above-identified patent and that said Letters Patent is hereby corrected as shown below:

Title page,
Item [57], ABSTRACT,
Lines 3 and 4, please replace "Each of the databases…" with -- Each of the databases may store a subset of the configuration data and this subset of configuration data may be accessed by users at any of the sites within the process control system --.
Line 15, please replace the word "the" with -- to --.

Column 3,
Line 16, please remove the "comma" after "wide".
Line 63, please remove the "colon" between the words "main site".

Column 6,
Line 13, please add a -- hyphen -- between the words "stand alone".

Column 8,
Line 61, please delete "Areal" and insert -- Area1 --.

Column 13,
Line 50, please delete "main site 111" and insert -- main site 101 --.

Column 19,
Line 17, please remove the "comma" after the word "or".

Column 32,
Line 31, please begin a new paragraph with "Thereafter".

Column 36,
Line 42, please remove the "hyphen" between "lock on".

UNITED STATES PATENT AND TRADEMARK OFFICE
CERTIFICATE OF CORRECTION

PATENT NO. : 6,687,698 B1
DATED : February 3, 2004
INVENTOR(S) : Mark J. Nixon et al.

It is certified that error appears in the above-identified patent and that said Letters Patent is hereby corrected as shown below:

Column 42,
Line 49, please delete "Portion" and insert -- portions --.

Signed and Sealed this

Fourth Day of January, 2005

JON W. DUDAS
*Director of the United States Patent and Trademark Office*